United States Patent
Krishnamoorthy et al.

(10) Patent No.: US 9,591,685 B2
(45) Date of Patent: Mar. 7, 2017

(54) EFFICIENT APPLICATION SYNCHRONIZATION USING OUT-OF-BAND DEVICE-TO-DEVICE COMMUNICATION

(71) Applicant: QUALCOMM Incorporated, San Diego, CA (US)

(72) Inventors: Parthasarathy Krishnamoorthy, San Diego, CA (US); Prashanth Mohan, Hyderbad (IN); KrishnaKumar Vasanthasenan, Hyderbad (IN); Georgios Tsirtsis, London (GB); Srujith Reddy Katamreddy, Hyderbad (IN); Daniel David Raj, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/805,163

(22) Filed: Jul. 21, 2015

(65) Prior Publication Data
US 2017/0027008 A1    Jan. 26, 2017

(51) Int. Cl.
*H04J 3/06* (2006.01)
*H04W 76/02* (2009.01)
*H04L 29/08* (2006.01)

(52) U.S. Cl.
CPC ......... *H04W 76/023* (2013.01); *H04L 67/107* (2013.01); *H04L 67/1072* (2013.01)

(58) Field of Classification Search
CPC combination set(s) only.
See application file for complete search history.

(56) References Cited

U.S. PATENT DOCUMENTS

| | | |
|---|---|---|
| 6,816,881 B1 | 11/2004 | Mohindra et al. |
| 8,850,045 B2 | 9/2014 | Berg et al. |
| 2014/0057667 A1 | 2/2014 | Blankenship et al. |
| 2014/0162544 A1 | 6/2014 | Edge |

(Continued)

OTHER PUBLICATIONS

International Search Report and Written Opinion—PCT/US2016/034006—ISA/EPO—Aug. 18, 2016.
(Continued)

*Primary Examiner* — Frank Duong
(74) *Attorney, Agent, or Firm* — Muncy, Geissler, Olds & Lowe, P.C.

(57) ABSTRACT

The disclosure generally relates to synchronizing application account data using out-of-band device-to-device (D2D) communication between peer wireless devices. More particularly, a first device may generate a local unique expression that includes a name, one or more user credentials, and a last update time associated with an application registered for a D2D-based application synchronization service. In response to detecting one or more external unique expressions from one or more peer devices in proximity that match the name and the user credentials associated with the registered application, the first device may then identify, among the one or more peer devices, an update device associated with an external unique expression having a last update time more recent than the last update time associated with the local unique expression and request an update to synchronize the application account data associated with the registered application from the update device over an out-of-band D2D connection.

30 Claims, 15 Drawing Sheets

(56) References Cited

U.S. PATENT DOCUMENTS

| | | | |
|---|---|---|---|
| 2014/0213250 A1* | 7/2014 | Baek | H04W 76/023 |
| | | | 455/434 |
| 2014/0359637 A1 | 12/2014 | Yan | |
| 2015/0019717 A1 | 1/2015 | Li et al. | |
| 2016/0044618 A1* | 2/2016 | Sheng | H04W 56/0005 |
| | | | 370/329 |
| 2016/0119769 A1* | 4/2016 | Gustafsson | H04L 67/16 |
| | | | 370/329 |
| 2016/0212607 A1* | 7/2016 | Trichias | H04W 4/22 |

OTHER PUBLICATIONS

Andreev S., et al., "Cellular Traffic Offloading onto Network-Assisted Device-to-Device Connections," IEEE Communications Magazine, Feb. 12, 2014, 21 pages.

Doumiati S., et al., "A framework for LTE-A Proximity-based Device-to-Device Service Registration and Discovery," Procedia Computer Science, vol. 34, 2014, pp. 87-94.

\* cited by examiner

EFFICIENT APPLICATION SYNCHRONIZATION USING OUT-OF-BAND DEVICE-TO-DEVICE COMMUNICATION

TECHNICAL FIELD

Various aspects described herein generally relate to device-to-device (D2D) communication, and in particular, to synchronizing application data using out-of-band D2D communication between peer wireless devices.

BACKGROUND

Wireless communication systems are widely deployed to provide various types of communication content, including voice, video, packet data, messaging, and broadcast, among many others. Wireless communication systems (e.g., multiple-access networks that can share available network resources to support multiple users) have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different wireless communication systems in use, including Cellular and Personal Communications Service (PCS) systems. Example cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), Orthogonal FDMA (OFDMA), Single-Carrier FDMA (SC-FDMA), the Global System for Mobile access (GSM) TDMA variation, and newer hybrid digital communication systems that use both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols (e.g., Enhanced Data rates for GSM Evolution (EDGE)) and Universal Mobile Telecommunications System (UMTS) protocols (e.g., High-Speed Packet Access (HSPA)).

In general, a wireless communication network may include various base stations (also referred to as evolved node Bs, eNBs, or access nodes) that can support communication for a user equipment (UE). In a WAN, a UE typically communicates via uplink/downlink channels between the UE and a base station to thereby communicate with the base station. However, if two or more UEs are in within sufficient proximity to one another, the UEs may be enabled to communicate directly, that is, without communicating through any base station. A UE may therefore support direct peer-to-peer (P2P) or device-to-device (D2D) communication with one or more other UEs. For example, LTE Direct (LTE-D, sometimes also referred to as "LTE-Advanced") is a proposed 3GPP (Release 12) D2D solution for proximate discovery. LTE-D dispenses with location tracking and network calls by directly monitoring for services on other LTE Direct devices within a large range (~500 m, line of sight). As such, among other advantages, LTE-D can directly monitor for services on other LTE-D devices in a synchronous system and concurrently detect many services in proximity in a continuous and battery efficient manner.

LTE-D operates on licensed spectrum as a service to mobile applications and provides D2D solution that enables service layer discovery. Mobile applications on LTE-D devices can instruct LTE-D to monitor for mobile application services on other devices and announce their own services at the physical layer for detection by services on other LTE-D devices, which allows the applications to be closed while LTE-D does the work in a substantially continuous manner and notifies the client application when a match to the monitor is detected. Accordingly, LTE-D is an attractive alternative to mobile developers seeking to deploy proximate discovery solutions to extend their existing services. For example, LTE-D is a distributed discovery solution (versus the centralized discovery that exists today), whereby mobile applications may forego centralized database processing in identifying relevancy matches because relevance may instead be determined autonomously at the device level via transmitting and monitoring for relevant attributes. LTE-D offers additional power consumption benefits because LTE-D does not perpetually track location to determine proximity and privacy benefits because discovery may be kept on the device such that users have more control over information shared with external devices.

Furthermore, LTE-D can increase network efficiency because devices communicate directly using cellular spectrum without utilizing the cellular network infrastructure. As such, because LTE-D uses licensed cellular spectrum, cellular coverage can be extended and interference from other devices can be controlled (unlike D2D communication in unlicensed bands). Accordingly, LTE-D may use direct connections to transfer substantial data between LTE-D enabled devices that are within sufficient proximity, thereby offloading traffic from the network infrastructure. Moreover, in addition to allowing high data transfer rates, LTE-D offers low delays and low energy consumption at the UEs communicating over an LTE-D link. Furthermore, LTE-D offers applications in national security and public safety networks because LTE provides high data rates that can enable real-time data and multimedia exchange between emergency personnel in crisis situations and the D2D functionality can improve performance in LTE-based public safety networks in the event that the LTE infrastructure may be totally or partially disabled (e.g., in disaster scenarios such as earthquakes, hurricanes, terrorist attacks, etc.).

Accordingly, techniques to efficiently support D2D communication are desired to enable new services, improve existing services, eliminate and/or reduce interference, and/or reduce traffic load on network infrastructures, among other things.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects disclosed herein in a simplified form to precede the detailed description presented below.

According to various aspects, the disclosure generally relates to device-to-device (D2D) application synchronization. For example, according to various aspects, a method for D2D application synchronization may comprise generating, at a first device, a local unique expression that includes a name, one or more user credentials, and a last update time associated with an application registered for a D2D-based application data synchronization service, detecting, at the first device, one or more external unique expressions that are received from one or more peer devices in proximity to the first device and match the name and the one or more user credentials associated with the registered application, identifying, among the one or more peer devices, an update device associated with an external unique expression that includes a last update time more recent than the last update time associated with the local unique expression, and requesting an update to synchronize the application data associated with the registered application from the update device over an out-of-band D2D connection. Furthermore, according to various aspects, the first device may start one or more timers upon requesting the update to synchronize the application data over the D2D connection, synchronize the application data using updated data received from the update device over the D2D connection while the one or more timers have not expired, and synchronize the application data associated with the registered application from a network server in response to determining that the one or more timers have expired. In addition, according to various aspects, the method may optionally further comprise broadcasting the local unique expression associated with the registered application, receiving, from a second device among the one or more peer devices, a request to update the application data associated with the registered application over a second D2D connection, wherein the last update time in the local unique expression is more recent than the last update time in the external unique expression received from the second device, and transmitting updated data associated with the application to the second device over the second D2D connection.

According to various aspects, a wireless device may comprise a transmitter configured to broadcast a local unique expression that includes a name, one or more user credentials, and a last update time associated with an application registered for a D2D-based application data synchronization service, a receiver configured to receive one or more external unique expressions from one or more peer wireless devices in proximity to the wireless device, and one or more processors configured to detect that the one or more external unique expressions match the name and the one or more user credentials associated with the registered application, identify, among the one or more peer wireless devices, an update device associated with an external unique expression that includes a last update time more recent than the last update time associated with the local unique expression, and request an update to synchronize the application data associated with the registered application from the update device over an out-of-band D2D connection.

According to various aspects, an apparatus may comprise means for generating a local unique expression that includes a name, one or more user credentials, and a last update time associated with an application registered for a D2D-based application data synchronization service, means for detecting one or more external unique expressions that are received from one or more peer devices in proximity to the apparatus and match the name and the one or more user credentials associated with the registered application, means for identifying, among the one or more peer devices, an update device associated with an external unique expression that includes a last update time more recent than the last update time associated with the local unique expression, and means for requesting an update to synchronize the application data associated with the registered application from the update device over an out-of-band D2D connection.

According to various aspects, a computer-readable storage medium may have computer-executable instructions recorded thereon, wherein the computer-executable instructions, when executed on a wireless device, may cause the wireless device to generate a local unique expression that includes a name, one or more user credentials, and a last update time associated with an application registered for a D2D-based application data synchronization service, detect one or more external unique expressions received from one or more peer devices in proximity to the wireless device that match the name and the user credentials associated with the registered application, identify, among the one or more peer devices, an update device associated with an external unique expression that includes a last update time more recent than the last update time associated with the local unique expression, and request an update to synchronize the application data associated with the registered application from the update device over an out-of-band D2D connection.

Other objects and advantages associated with the various aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
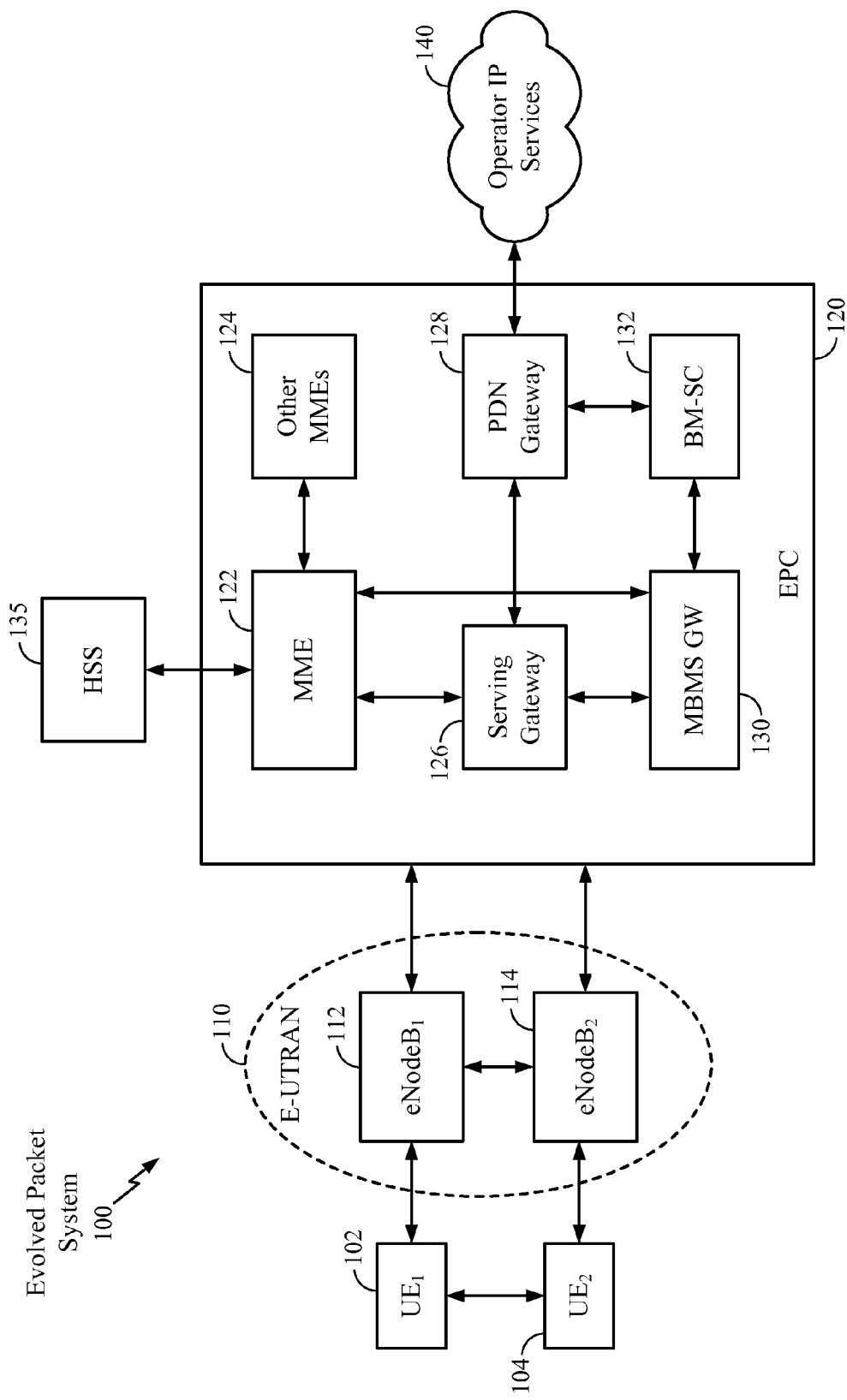
FIG. 1 illustrates an exemplary wireless network architecture supporting device-to-device (D2D) communication, according to various aspects.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further appreciate that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or a combination thereof. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used in connection with various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

According to various aspects, FIG. 1 illustrates an exemplary wireless network architecture 100 that may support out-of-band device-to-device (D2D) communication, wherein the wireless network architecture 100 may comprise a Long Term Evolution (LTE) (or Evolved Packet System (EPS)) network architecture 100. In various embodiments, the network architecture 100 may include a first user equipment ($UE_1$) 102, a second user equipment ($UE_2$) 104, an Evolved UMTS Terrestrial Radio Access Network (E-UTRAN) 110, an Evolved Packet Core (EPC) 120, a Home Subscriber Server (HSS) 135, and Internet Protocol (IP) Services 140 associated with an operator (e.g., a mobile network operator (MNO)). The EPS network architecture 100 can interconnect with other access networks and core networks (not shown), such as a UMTS access network or an IP core network. As shown, the EPS network architecture 100 provides packet-switched services; however, those skilled in the art will readily appreciate that the various concepts disclosed herein may be extended to networks that provide circuit-switched services.

According to various embodiments, the E-UTRAN 110 may include a first evolved Node B ($eNB_1$) 112 in communication with $UE_1$ 102 and a second eNB ($eNB_2$) 114 in communication with $UE_2$ 104. The eNBs 112, 114 may provide user and control plane protocol terminations toward the UEs 102, 104 and may be connected to each other via a backhaul (e.g., an X2 interface). The eNBs 112, 114 may also be referred to as base stations, Node Bs, access points, base transceiver stations, radio base stations, radio transceivers, transceiver functions, a basic service set (BSS), an extended service set (ESS), or some other suitable terminology. The eNBs 112, 114 each provide an access point to the EPC 120 for the respective UEs 102, 104. Example UEs 102, 104 may include, without limitation, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. Furthermore, those skilled in the art will appreciate that $UE_1$ 102 and/or $UE_2$ 104 may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, etc.

The eNBs 112, 114 may each connect to the EPC 120 via an Si interface, wherein the EPC 120 may include a Mobility Management Entity (MME) 122, other MMEs 124, a Serving Gateway 126, a Multimedia Broadcast Multicast Service (MBMS) Gateway 130, a Broadcast Multicast Service Center (BM-SC) 132, and a Packet Data Network (PDN) Gateway 128. The MME 122 is a control node that may process signaling between the UEs 102, 104 and the EPC 120. Generally, the MME 122 provides bearer and connection management, while all user IP packets are transferred through the Serving Gateway 126, which may be connected to the PDN Gateway 128. The PDN Gateway 128 may provide UE IP address allocation as well as other functions. The PDN Gateway 128 is connected to the Operator IP Services 140, which may include the Internet, an intranet, an IP Multimedia Subsystem (IMS), a PS Streaming Service (PSS), and/or other suitable services. The BM-SC 132 may provide functions for MBMS user service provisioning and delivery and serve as an entry point for content provider MBMS transmission. Furthermore, according to various aspects, the BM-SC 132 may authorize and initiate MBMS Bearer Services within a PLMN, schedule and deliver MBMS transmissions, and/or provide other similar functions. The MBMS Gateway 130 may be used to distribute MBMS traffic to one or more eNBs that belong to a Multicast Broadcast Single Frequency Network (MBSFN) area broadcasting a particular service (e.g., eNBs 112, 114), and may be responsible for session management (start/stop) and collecting eMBMS related charging information.

In various embodiments, a UE pair (e.g., $UE_1$ 102 and $UE_2$ 104) may establish an out-of-band device-to-device (D2D) connection to communicate directly without utilizing the respective $eNB_1$ 112 and $eNB_2$ 114 and subsequently transfer data traffic over the out-of-band D2D connection. In general, one or more entities in the network infrastructure (e.g., eNBs 112, 114, entities in the EPC 120, etc.) may coordinate the out-of-band D2D communication between the UE pair 102, 104, meaning that the network entities may assist in establishing the out-of-band D2D connection, control use in a D2D mode versus a legacy mode, provide security support, etc. As used herein, the terms "out-of-band D2D connection," "D2D mode," and/or other variants thereof may generally refer to direct communication between two or more UEs 102, 104 that does not pass through any base station, and the term "legacy connection," "legacy mode," and/or other variants thereof may generally refer to communication via the network (e.g., via the eNBs 112, 114). In various embodiments, the UE pair 102, 104 may establish the out-of-band D2D connection autonomously, wherein initial discovery used to establish the out-of-band D2D connection may be based on an ability to communicate signals directly between the UEs 102, 104. Additionally (or in the alternative), UEs that are attached to a network that does not support the D2D mode but permits the D2D mode, the UEs 102, 104 may connect via the network and exchange serving cell and location information to determine whether the D2D mode is possible. Once the D2D mode is in progress, the UEs 102, 104 may monitor relative locations associated therewith. Furthermore, a group including three or more UEs may enter the D2D mode whereby some or all UE pairs in the group may maintain direct D2D communication between one another and whereby some UEs in the group may act as relays to relay D2D communication between other UEs in the group. For example, one UE in the group may be designated to operate in a relay role to maintain direct D2D communication with the other UE(s) in the group and act in a relay role in order to enable the other UE(s) to communicate indirectly via D2D communication. In this example, the UE operating in the relay role may act to relay communications between the other UE(s) in the group. A group that includes several UEs employing D2D communication between one another may monitor relative locations associated therewith and assign (and/or reassign) the relay role to any UE in the group based on the current relative locations associated therewith.

Returning to FIG. 1, in another aspect, the network may assist the two or more UEs 102, 104 to enter the D2D mode in cases where the legacy mode may be unavailable and/or impossible (e.g., if the network is congested or portions thereof have temporarily failed or do not provide continuous radio coverage to both UEs 102, 104). In another aspect, the network (e.g., one or more network entities) may control entry to the D2D mode and support handover between the D2D mode and legacy mode.

Figure 2:
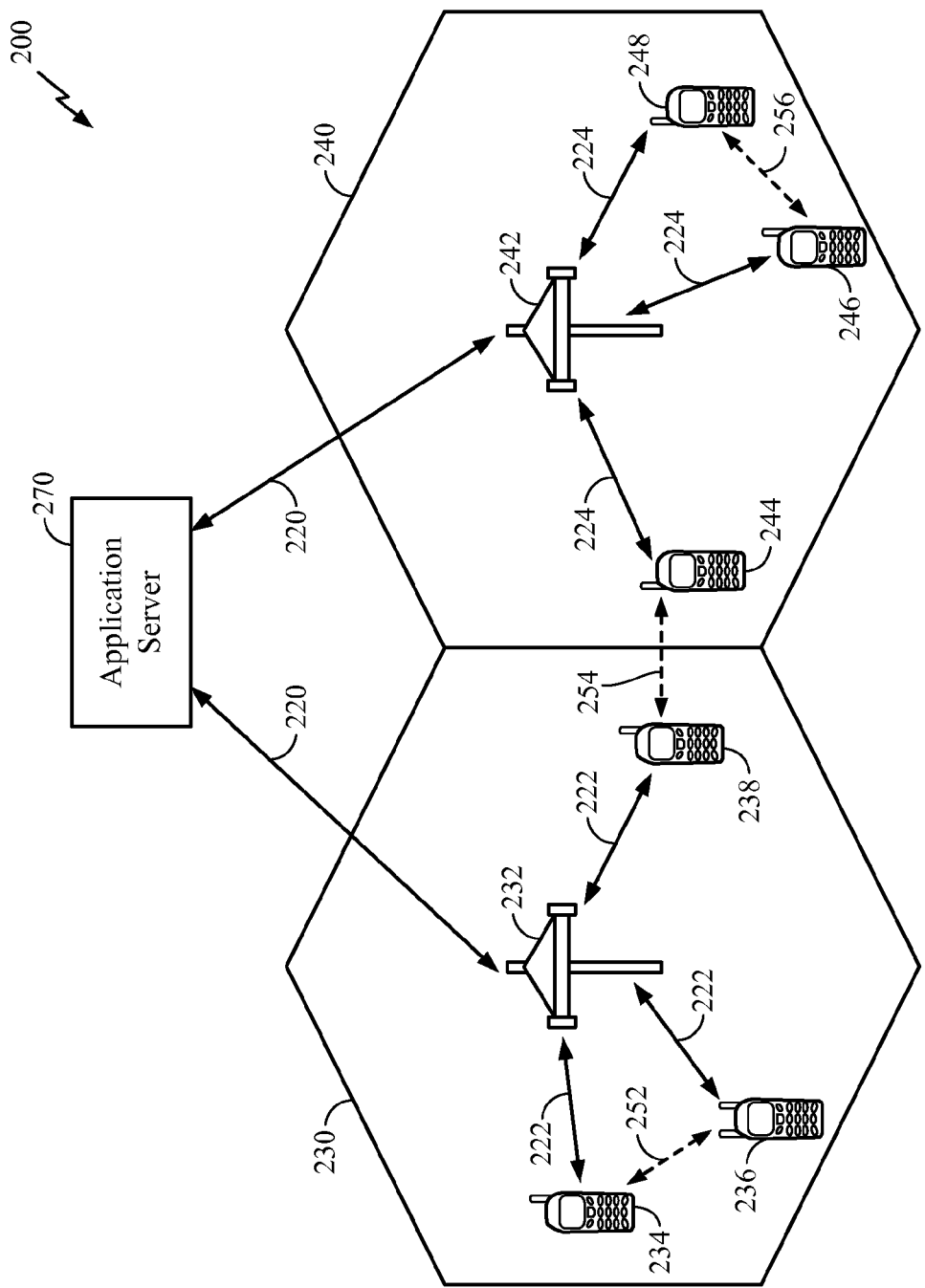
FIG. 2 illustrates an exemplary access network supporting D2D communication, according to various aspects.

According to various aspects, FIG. 2 illustrates an exemplary access network 200 in which certain devices may communicate over an out-of-band direct device-to-device (D2D) connection (e.g., using LTE Direct (LTE-D), Wi-Fi Direct (WFD), or another suitable D2D radio access technology). In addition, the devices in the access network 200 may also connect to a Wireless Wide Area Network (WWAN) or other suitable network infrastructure. Referring to FIG. 2, an application server 270 may be connected to a first cell 230 having a first base station 232 and to a second cell 240 having a second base station 242, wherein the application server 270 may be further coupled to the first base stations 232 and the second base station 242 via a network link 220 (e.g., an Rx link, a Gx link, etc.). The coverage area associated with a given base station is represented via the cell in which the given base station is located, whereby in FIG. 2, the first cell 230 includes the coverage area corresponding to the first base station 232 and the second cell 240 includes the coverage area corresponding to the second base station 242. The cells 230, 240 in the access network 200 include various UEs that communicate with the respective base stations 232, 242 and with the application server 270 via the respective base stations 232, 242. For example, in FIG. 2, the first cell 230 includes UE 234, UE 236, and UE 238, while the second cell 240 includes UE 244, UE 246, and UE 248, wherein one or more of the UEs in the access network 200 may be mobile or stationary. Although not shown in FIG. 2, the base stations 232, 242 may be connected to one another via a backhaul link.

According to various aspects, one or more of UE 234, UE 236, UE 238, UE 244, UE 246, and UE 248 may support direct device-to-device (D2D) communication, whereby such UEs may communicate with one another directly out-of-band (i.e., without having to communicate through another device or a network infrastructure element such as the first base station 232 and the second base station 242). In addition, such UEs may further support legacy communication through the network infrastructure elements such as the first base station 232 and/or the second base station 242. In legacy communication that involves network infrastructure, signals may generally be transmitted and received through uplink and downlink connections between various UEs and the base stations 232, 242, which may include a link 222 in the first cell 230 and a link 224 in the second cell 240, wherein the base stations 232, 242 each generally serve as the attachment point for the UEs in the corresponding cells 230, 240 and facilitate communication between the UEs served therein. In accordance with various aspects, when two or more UEs, such as UE 234 and UE 236, wish to communicate with one another and are located in sufficient proximity to each other, a direct D2D link can be established therebetween, which may offload traffic from the base station 232 serving the UEs 234, 236, allow the UEs 234, 236 to communicate more efficiently, or provide other advantages that will be apparent to those skilled in the art.

As shown in FIG. 2, the UE 246 can communicate with UE 248 through intermediate base station 242 via link 224, and UEs 246, 248 may further communicate via a D2D link 256. Furthermore, for inter-cell communication where the participating UEs are in different nearby cells, a direct D2D communication link is still a possibility, which is illustrated in FIG. 2 where UE 238 and UE 244 may communicate using direct D2D communication illustrated by dashed link 254. In certain situations, two or more UEs in the access network 200 could potentially be associated with a particular user using the same application with the same user name and credentials across multiple devices (e.g., an email application). However, under existing synchronization algorithms and implementations, the multiple devices that are running the same application with the same user name and credentials may individually perform the synchronization procedure with the corresponding application server 270 without utilizing or considering the latest synchronization data that may be available on other devices located in proximity running the same application with the same user name and credentials, which tends to be an inefficient approach for several reasons. For example, consider a use case in which two UEs (e.g., UE pair 234, 236, UE pair 238, 244, UE pair 246, 256, etc.) both belong to the same user, support direct D2D communication (e.g., via LTE-Direct, Wi-Fi Direct, etc.), and have the same application installed and logged into the application server 270 with the same user credentials. Further assuming that one UE in the UE pair has performed a synchronization procedure with the application server 270 more recently than the other UE in the UE pair, inefficiencies may result if the other UE also synchronizes data associated with the application through the application server 270 rather than utilizing or considering the more recently synchronized application data available on the other UE located in proximity thereto. For example, in a situation where the access network 200 corresponds to a cellular network (e.g., an LTE network) and UE 244 has synchronized the application data via the application server 270 more recently than UE 238, having the UE 238 utilize cellular resources to synchronize application data through the application server 270 via legacy cellular links 222, 220 may unnecessarily consume resources in the cellular access network 200, lower data speeds depending on the load in the cellular access network 200, result in higher power consumption at the UE 238 due to the need to transmit at a higher power to close the loop with the base station 232, and so on. In another example, in a situation where the first cell 230 corresponds to a Wi-Fi network and UE 234 has synchronized the application data via the application server 270 more recently than UE 236, having the UE 236 utilize the Wi-Fi network 230 to synchronize application data through the application server 270 via legacy Wi-Fi links 222, 220 may cause a higher round-trip time (RTT) delays, lower data speeds depending on backhaul congestion, and so on. Accordingly, as will be described in further detail below, the above-mentioned problems may be alleviated via efficiently synchronizing the application data over an out-of-band D2D connection rather than the legacy links 222, 224, 220, which may improve performance at the UEs performing the synchronization procedure over the out-of-band D2D connection, reduce backhaul congestion and loading in the access network, and allow other users in the same access network 200 to be allocated more resource blocks from the base stations 232, 242 and thereby achieve high throughput, among other advantages.

Figure 3:
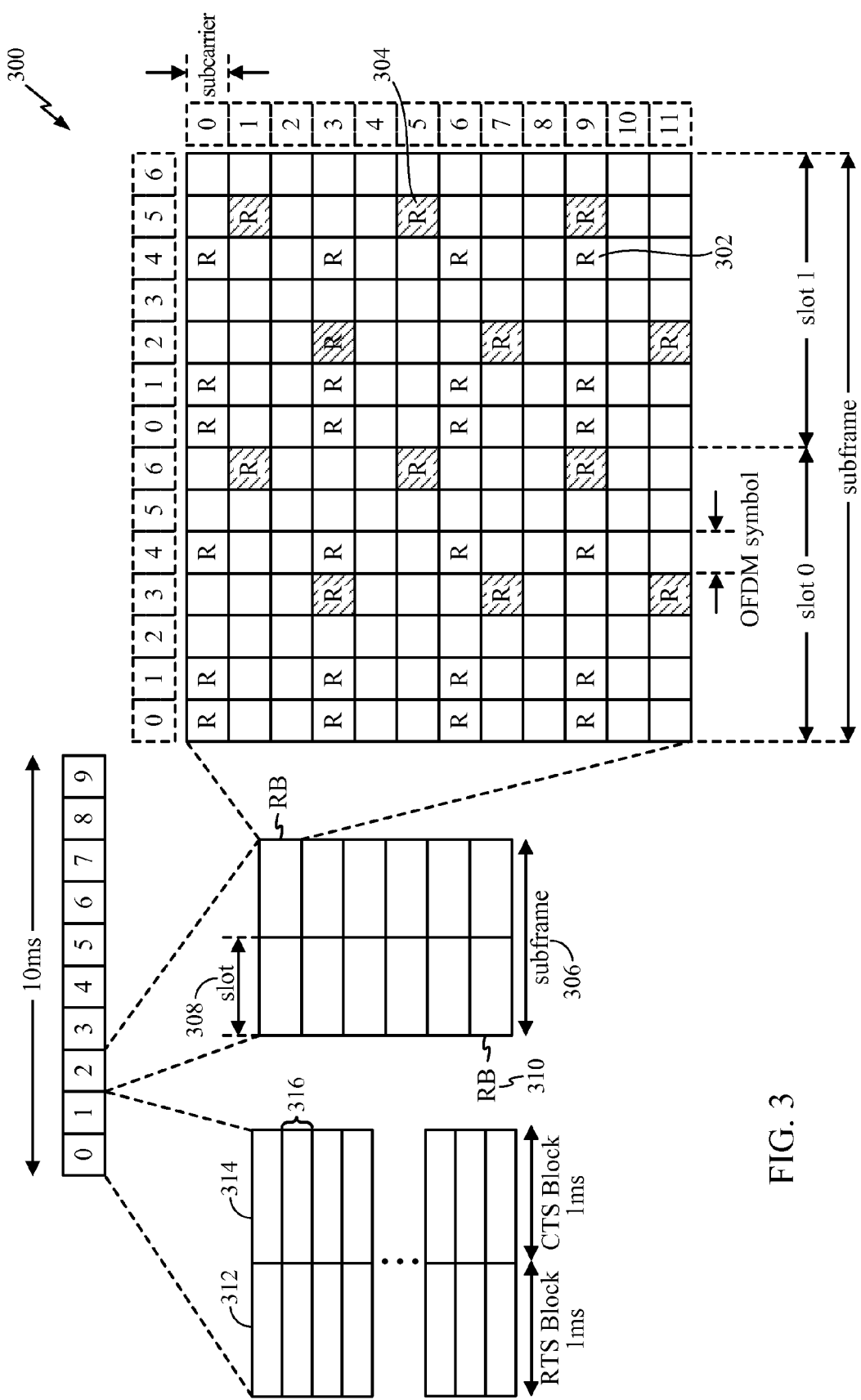
FIG. 3 illustrates an exemplary downlink (DL) frame structure in LTE, according to various aspects.
Figure 4:
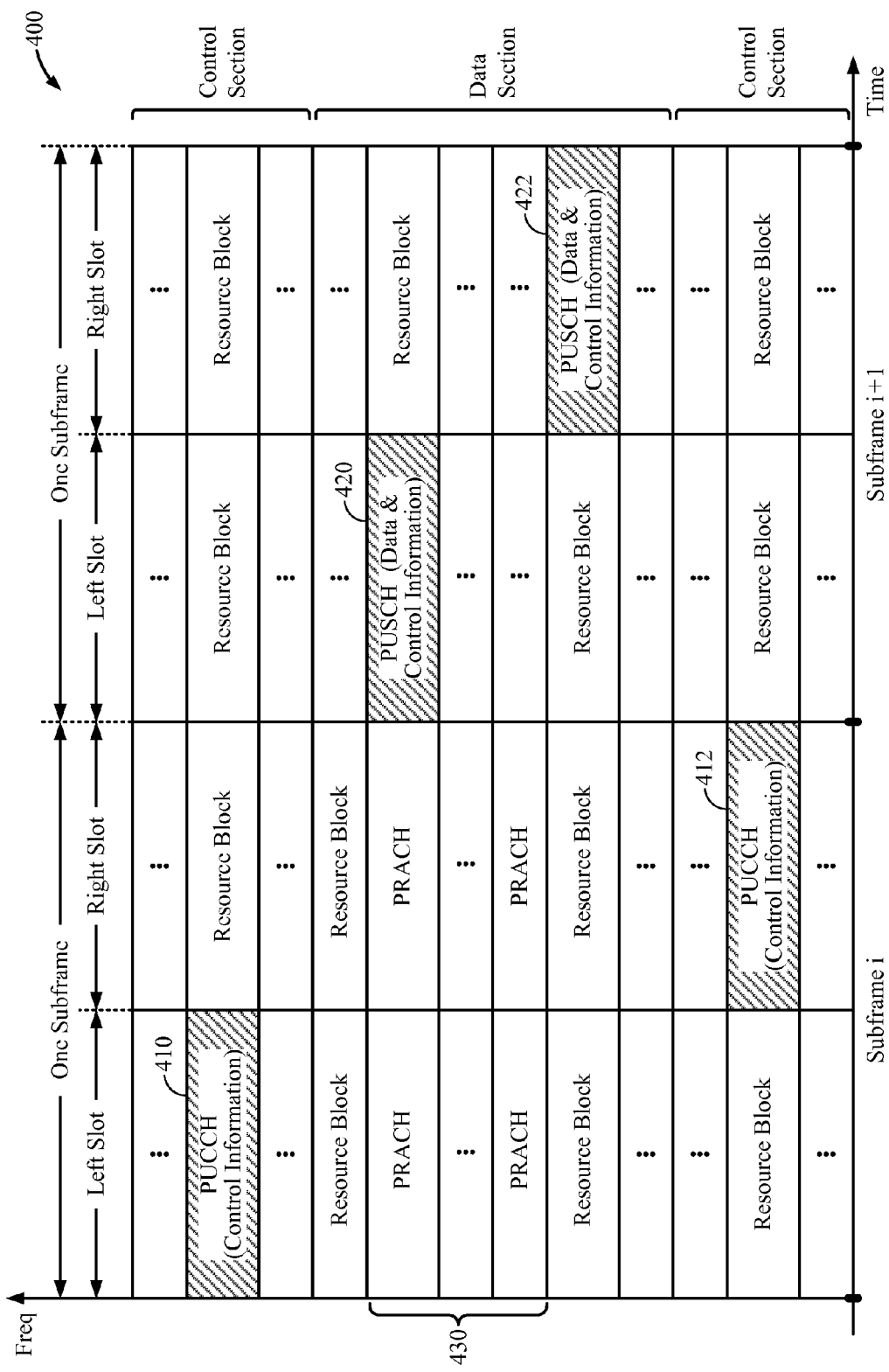
FIG. 4 illustrates an exemplary uplink (UL) frame structure in LTE, according to various aspects.

For example, the various data and signaling issues that may arise when proximally located UEs that could synchronize data associated with the same application and the same user credentials over a D2D communication link instead individually synchronize the application data with an application server utilizing legacy communication links will become clearer with reference to FIG. 3 and FIG. 4, which respectively illustrate an exemplary downlink (DL) frame structure 300 in LTE and an exemplary uplink (UL) frame structure 400 in LTE. However, those skilled in the art will appreciate that the following description discusses the above-mentioned data and signaling issues within the context of LTE to simplify the discussion provided herein, whereby the same or similar issues may be applicable in wireless communication systems that support other D2D radio access technologies (e.g., Wi-Fi Direct, Bluetooth, ZigBee, NFC, etc.).

More particularly, referring to FIG. 3, the DL frame structure 300 in LTE may divide a ten millisecond (10 ms) frame into ten (10) equally sized sub-frames 306. Each sub-frame 306 may include two (2) consecutive time slots 308. A resource grid may be used to represent two time slots, wherein each time slot includes a resource block (RB) 310. In LTE, the resource grid may be divided into multiple resource elements. Further, in LTE, a RB 310 may contain twelve (12) consecutive subcarriers in the frequency domain and, for a normal cyclic prefix in each OFDM symbol, seven (7) consecutive OFDM symbols in the time domain, or eighty-four (84) resource elements. For an extended cyclic prefix, a resource block may contain six (6) consecutive OFDM symbols in the time domain and may have seventy-two (72) resource elements. A physical DL control channel (PDCCH), a physical DL shared channel (PD-SCH), and other channels may be mapped to the resource elements. Furthermore, some resource elements, as indicated as R 302, 304, include DL reference signals (DL-RS), which may include Cell-specific reference signals (CRS) (also sometimes called common RS) 302 and UE-specific reference signals (UE-RS) 304. In general, the UE-RS 304 may be transmitted only on the resource blocks upon which the corresponding PD-SCH is mapped. The number of bits that each resource element carries may vary depending on the modulation scheme. Accordingly, the more RBs that an eNB allocates to a UE and the higher the modulation scheme, the higher the data rate for the UE.

In LTE Direct (e.g., D2D communication in an LTE environment and as applicable to the out-of-band D2D communication as described herein), D2D communication links may be subject to distributed scheduling mechanisms. For example, according to various aspects, a request to send (RTS)/clear to send (CTS) handshake signaling exchange may be performed before each device in a potential D2D pair attempts to communicate data over an out-of-band D2D communication link. In LTE Direct (LTE-D), 24 RBs may be available for RTS/CTS signaling. Further, in LTE-D, a RB may be assigned as a RTS block 312 and another RB may be assigned as a CTS block 314 for each D2D communication link. In other words, each D2D communication link may use a RB pair for RTS/CTS signaling. As used herein, the RB pair may be referred to as a connection identifier (CID) 316.

Referring now to FIG. 4, the uplink (UL) frame structure 400 in LTE may partition the available resource blocks on the UL into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure may result in the data section including contiguous subcarriers, which may allow a single UE to be assigned all of the contiguous subcarriers in the data section.

A UE may be assigned resource blocks 410, 412 in the control section to transmit control information to an eNB. The UE may also be assigned resource blocks 420, 422 in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 may carry a random sequence and may not carry any UL data/signaling. In an aspect, a RACH sequence may be reserved for communication of ACK/NACK information from a UE while in idle mode. Each random access preamble may occupy a bandwidth corresponding to six consecutive resource blocks. The starting frequency may be specified by the network. That is, the transmission of the random access preamble may be restricted to certain time and frequency resources. There may be no frequency hopping for the PRACH. The PRACH attempt may be carried in one subframe (1 ms) or a few contiguous subframes and a UE may make only a single PRACH attempt per frame (10 ms).

Accordingly, in context with the above-mentioned scenarios where two or more UEs each individually synchronize data associated with a particular application using the same user name and user credentials via a particular target application server, the eNB in the cell(s) associated with each UE may allocate at least some resource blocks to the respective UEs that use legacy cellular communication links to communicate with the target application server. As such, fewer resource blocks may then be available to allocate to other UEs in the respective cell(s). However, if a first UE were to perform the synchronization procedure with the target application server and a second UE in sufficient proximity to the first UE were to subsequently obtain the most recent application data from the first UE over an out-of-band D2D connection rather than the application server using legacy communication links, the eNB associated with the second UE could allocate more resource blocks to other UEs in the cell associated therewith (i.e., from the resource blocks that no longer need to be allocated to enable communication between the second UE and the target application server). In that sense, the D2D communication between the first UE and the second UE may offload certain traffic from the cellular network, which may reduce loading and backhaul congestion in the cellular network, allow other UEs in the cell associated with the second UE to experience higher data dates and/or throughput, and improve performance at the second UE that no longer needs to transmit at a high power to close the loop with the eNB, potentially suffer from lower data speeds due to any loading and backhaul congestion that may exist in the cellular network, etc.

Figure 5:
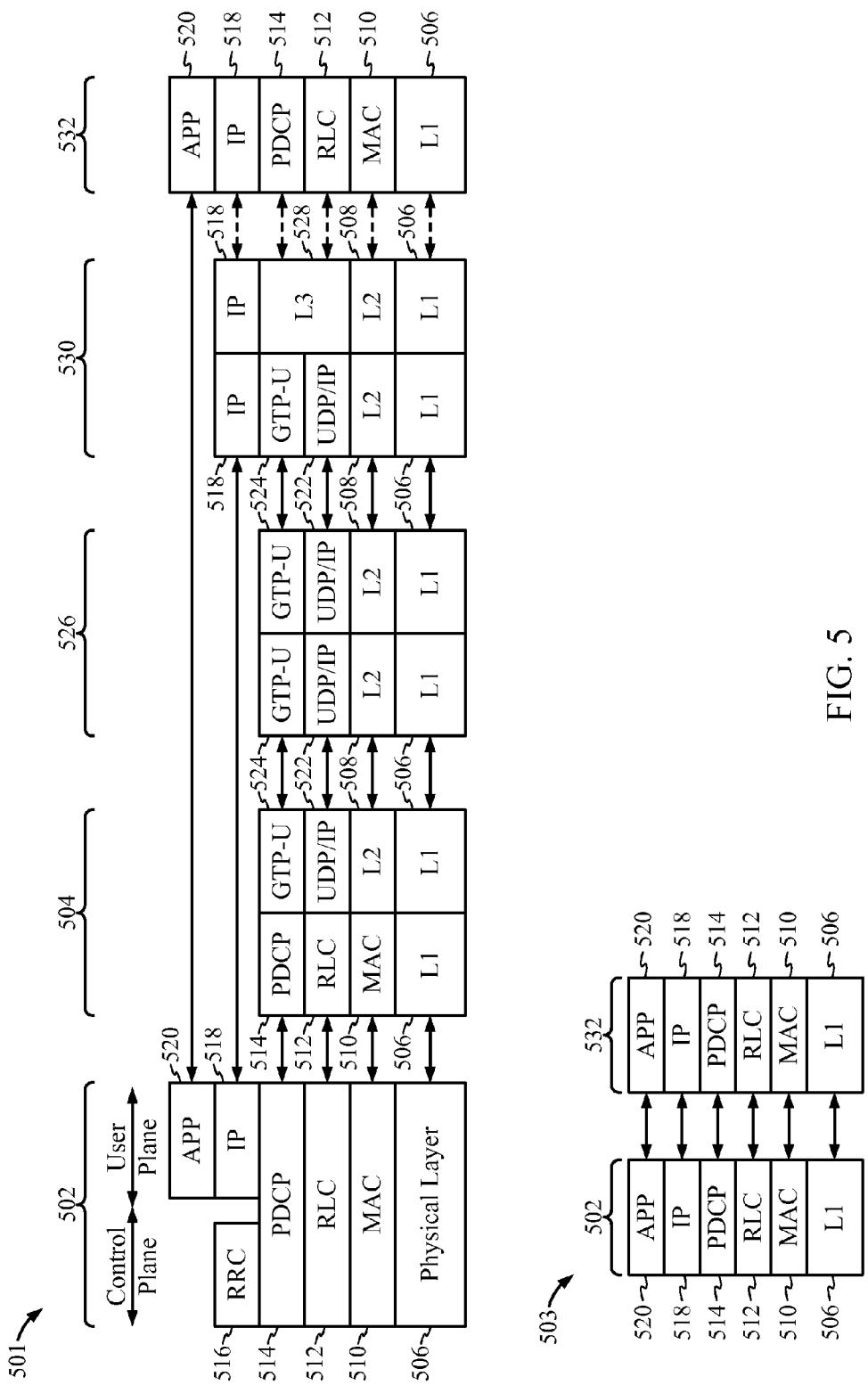
FIG. 5 illustrates an exemplary user plane and control plane radio protocol architecture, according to various aspects.

According to various aspects, FIG. 5 illustrates an exemplary user plane and control plane radio protocol architecture 501 for the user and control planes in LTE to support radio communication between a UE 502 and a UE 532 via an eNB 504, SWG 526, and PDN Gateway 530. Furthermore, in various embodiments, those skilled in the art sill appreciate that substantially the same and/or similar signaling to that described herein may occur between an eNB, SWG, and PDN Gateway supporting UE 532 (not shown). In various embodiments, the UE 502 shown in FIG. 5 may correspond to UE 102 and UE 532 may correspond to UE 104 as depicted in FIG. 1. In a similar respect, eNB 504 may correspond to eNB 112 in FIG. 1, SWG 526 may correspond to SWG 126 in FIG. 1, and PDN Gateway 530 may correspond to PDN Gateway 128 in FIG. 1. As noted above, further entities that are not shown in FIG. 5 may be present to convey user plane signaling between PDN Gateway 530 and UE 532 (e.g., an eNB, SWG, PDN Gateway, etc.).

In various embodiments, the radio protocol architecture 501 for the UE 502 and the eNB 504 is shown with three layers: Layer 1 (L1 layer), Layer 2 (L2 layer), and Layer 3 (L3 layer). Communication of data/signaling may occur between UE 502 and eNB 504 across the three layers. The L1 layer 506 is the lowest layer and implements various physical layer signal processing functions. The L1 layer 506 may also be referred to as the physical layer 506, the physical L1 layer 506, or variants thereof. The L2 layer is above the physical L1 layer 506 and is responsible for the link between the UE 502 and eNB 504 over the physical L1 layer 506. In the user plane associated with UE 502, the L2 layer includes a media access control (MAC) sublayer 510, a radio link control (RLC) sublayer 512, and a packet data convergence protocol (PDCP) 514 sublayer, which are terminated at the eNB on the network side. The UE 502 may have several upper layers above the L2 layer, which may include a network layer (e.g., IP layer) 518 that may correspond to the L3 layer, which may terminate at the PDN Gateway 530 on the network side, and an application layer 520 that may terminate at the other end of the connection (e.g., far end UE 532, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 may provide segmentation and reassemble upper layer data packets, retransmit lost data packets, and reorder data packets to compensate for out-of-order reception due to hybrid automatic repeat request (HARQ). The MAC sublayer 510 may provide multiplexing between logical and transport channels. The MAC sublayer 510 may also allocate the various radio resources (e.g., resource blocks) in one cell among the UEs. The MAC sublayer 510 may also be responsible for HARQ operations. In an operational aspect, user plane signaling from UE 502 (e.g., MAC 510 layer signaling, RLC 512 layer signaling and PDCP 514 layer signaling) may be conveyed across the network using other protocol layers such as some level 2 (L2) protocol 508, a user datagram protocol/IP (UDP/IP) 522, and general packet radio service (GPRS) tunneling protocol-user plane (GTP-U) 524.

FIG. 5 further illustrates an example radio protocol architecture 503 for the user plane in LTE to support direct radio communication between a UE 502 and UE 532. In an aspect, each layer (e.g., layers 520, 518, 514, 512, 510, and 506) associated with UE 502 may communicate directly with the corresponding layers associated with UE 532 and may be the same layers used to communicate between the UE 502 and the eNB 504 in the legacy mode as described above with respect to radio protocol architecture 501.

In the control plane, the radio protocol architecture for the UE 502 and eNB 504 is substantially the same for the physical L1 layer 506 and the L2 layer with the exception that there is no header compression function for the control plane. The control plane also includes a radio resource control (RRC) sublayer 516 in the L3 layer. The RRC sublayer 516 may have the responsibility to obtain radio resources (i.e., radio bearers) and configure the lower layers using RRC signaling between the eNB 504 and the UE 502.

Figure 6:
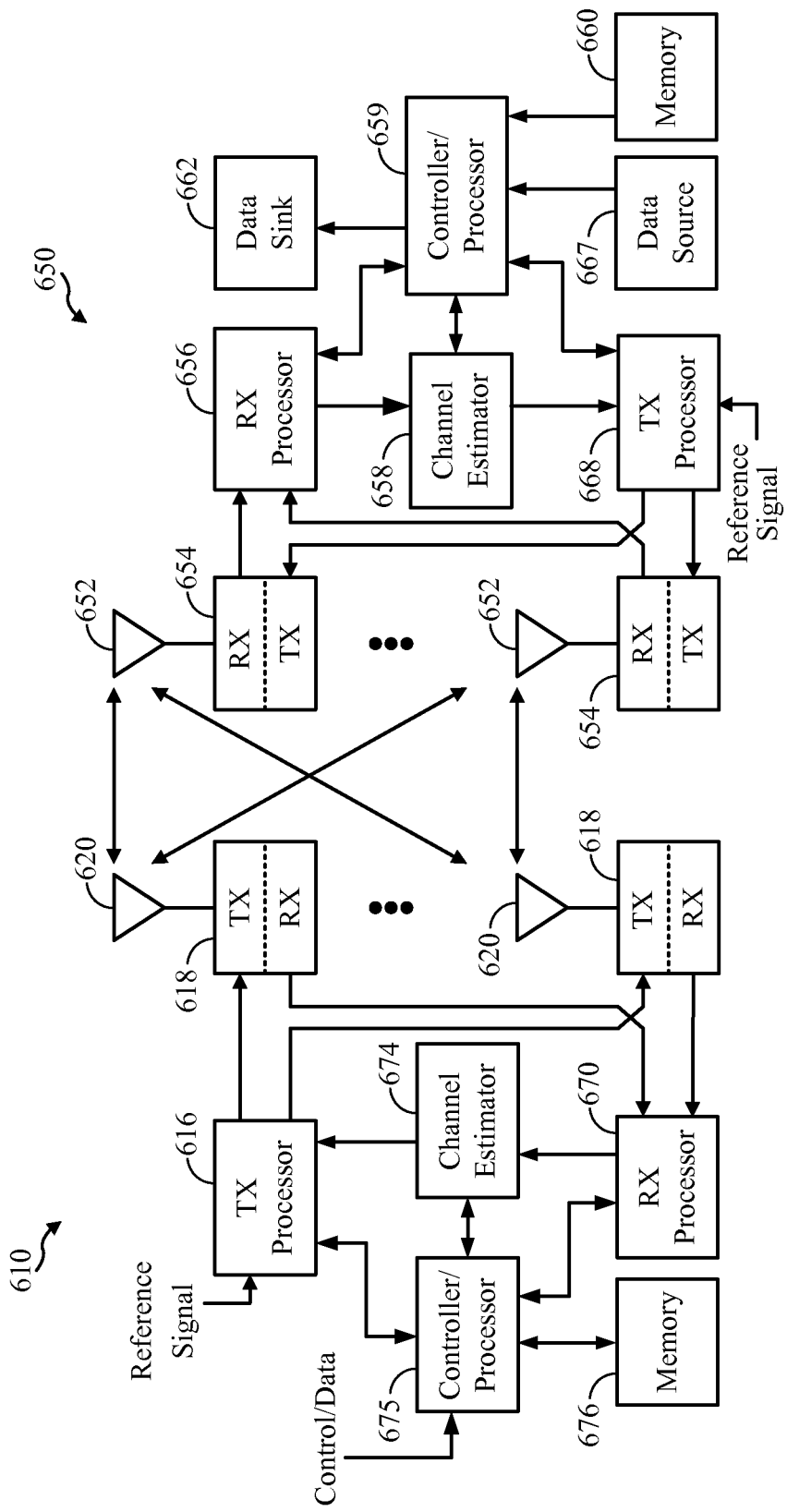
FIG. 6 illustrates an exemplary evolved Node B (eNB) and user equipment (UE) in an access network, according to various aspects.

According to various aspects, FIG. 6 illustrates an exemplary LTE network entity (e.g., eNB, MME, PDN Gateway, CSCF, etc.) 610 in direct or indirect communication with an exemplary UE 650, wherein the UE 650 may be UE 102 or 104 in FIG. 1 and the LTE network entity 610 may be any of the entities associated with the E-UTRAN 110, EPC 120, etc. in FIG. 1. On the downlink (DL), upper layer packets from the core network are provided to a controller/processor 675 that implements the functionality of the L2 layer described above. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 at the network entity 610 may implement various signal processing functions for the L1 layer (i.e., the physical layer), wherein the signal processing functions performed at the TX processor 616 may include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams, and each stream may then be mapped to an OFDM subcarrier, multiplexed with a reference signal (e.g., pilot) in the time and/or frequency domain, and then combined together using an Inverse Fast Fourier Transform (IFFT) to produce a physical channel that carries a time domain OFDM symbol stream. The OFDM stream may be spatially precoded to produce multiple spatial streams. Channel estimates from a channel estimator 674 may be used to determine the coding and modulation scheme and perform spatial processing. The channel estimate may be derived from a reference signal and/or channel condition feedback transmitted by the UE 650. Each spatial stream may then be provided to a different antenna 620 via separate transmitters TX 618 that may each modulate an RF carrier with a respective spatial stream for transmission.

At the UE 650, each receiver RX 654 may receive a signal through a respective antenna 652, recover information modulated onto an RF carrier, and provide the modulated information to a receive (RX) processor 656. The RX processor 656 may implement various signal processing functions associated with the L1 layer described above. For example, according to various aspects, the RX processor 656 may perform spatial processing on the modulated information to recover any spatial streams destined for the UE 650. If multiple spatial streams are destined for the UE 650, the RX processor 656 may combine the multiple spatial streams into a single OFDM symbol stream, wherein the RX processor 656 may then convert the single OFDM symbol stream from a time-domain to a frequency domain using a Fast Fourier Transform (FFT). The frequency domain signal may comprise a separate OFDM symbol stream for each subcarrier of the OFDM signal. To recover and demodulate the symbols on each subcarrier and the reference signal, the most likely signal constellation points transmitted from the LTE network entity 610 may be determined, wherein these soft decisions may be based on channel estimates computed at the channel estimator 658. The soft decisions may then be decoded and deinterleaved to recover the data and control signals that the LTE network entity 610 originally transmitted on the physical channel, wherein the recovered data and the recovered control signals may then be provided to a controller/processor 659.

According to various aspects, the controller/processor 659 may implement the L2 layer described above, wherein the controller/processor 659 can be associated with a memory 660 that stores program code, data, and/or other suitable information. According to various aspects, the memory 660 may be referred to as a computer-readable medium. On the UL, the controller/processor 659 may provide demultiplexing between transport and logical channels, packet reassembly, deciphering, header decompression, and control signal processing to recover upper layer packets from the core network. The upper layer packets may then be provided to a data sink 662, wherein the data sink 662 may represent all the protocol layers above the L2 layer as described above. Various control signals may also be provided to the data sink 662 for L3 processing. The controller/processor 659 may also have responsibility to perform error detection using an acknowledgement (ACK) and/or negative acknowledgement (NACK) protocol to support HARQ operations.

In the UL direction, a data source 667 at the UE 650 may be used to provide upper layer packets to the controller/processor 659. The data source 667 may represent all protocol layers above the L2 layer as described above. Similar to the functionality described above in connection with the DL transmission from the LTE network entity 610, the controller/processor 659 may implement the L2 layer for the user plane and the control plane, which may involve functionality to provide header compression, ciphering, packet segmentation and reordering, and multiplexing between logical and transport channels based on radio resources that the LTE network entity 610 may have allocated. The controller/processor 659 may also have the responsibility to perform HARQ operations, retransmit lost packets, and signaling to the LTE network entity 610.

According to various aspects, the TX processor 668 may use channel estimates derived at the channel estimator 658 from the reference signal and/or feedback transmitted from the LTE network entity 610 to select appropriate coding and modulation schemes and facilitate spatial processing. The spatial streams generated at the TX processor 668 may be provided to different antenna 652 via separate transmitters TX 654 that may modulate a respective RF carrier with a respective spatial stream for transmission.

The UL transmission may be processed at the LTE network entity 610 in a manner similar to that described above in connection with the receiver function at the UE 650. In particular, each receiver RX 618 at the LTE network entity 610 may receive a signal through a respective antenna 620, recover information modulated onto an RF carrier, and provide the modulated information to a RX processor 670, which may implement the L1 layer as described above. The controller/processor 675 may implement the L2 layer, wherein the controller/processor 675 can be associated with a memory 676 that stores program code, data, and/or other suitable information. The memory 676 may also be referred to as a computer-readable medium. On the UL, the control/processor 675 may provide demultiplexing between transport and logical channels, packet reassembly, deciphering, header decompression, and control signal processing to recover upper layer packets from the UE 650. Upper layer packets from the controller/processor 675 may be provided to the core network. The controller/processor 675 may also have the responsibility to perform error detection using an ACK and/or NACK protocol to support HARQ operations, retransmit lost packets, and signaling to the UE 650.

Figure 7:
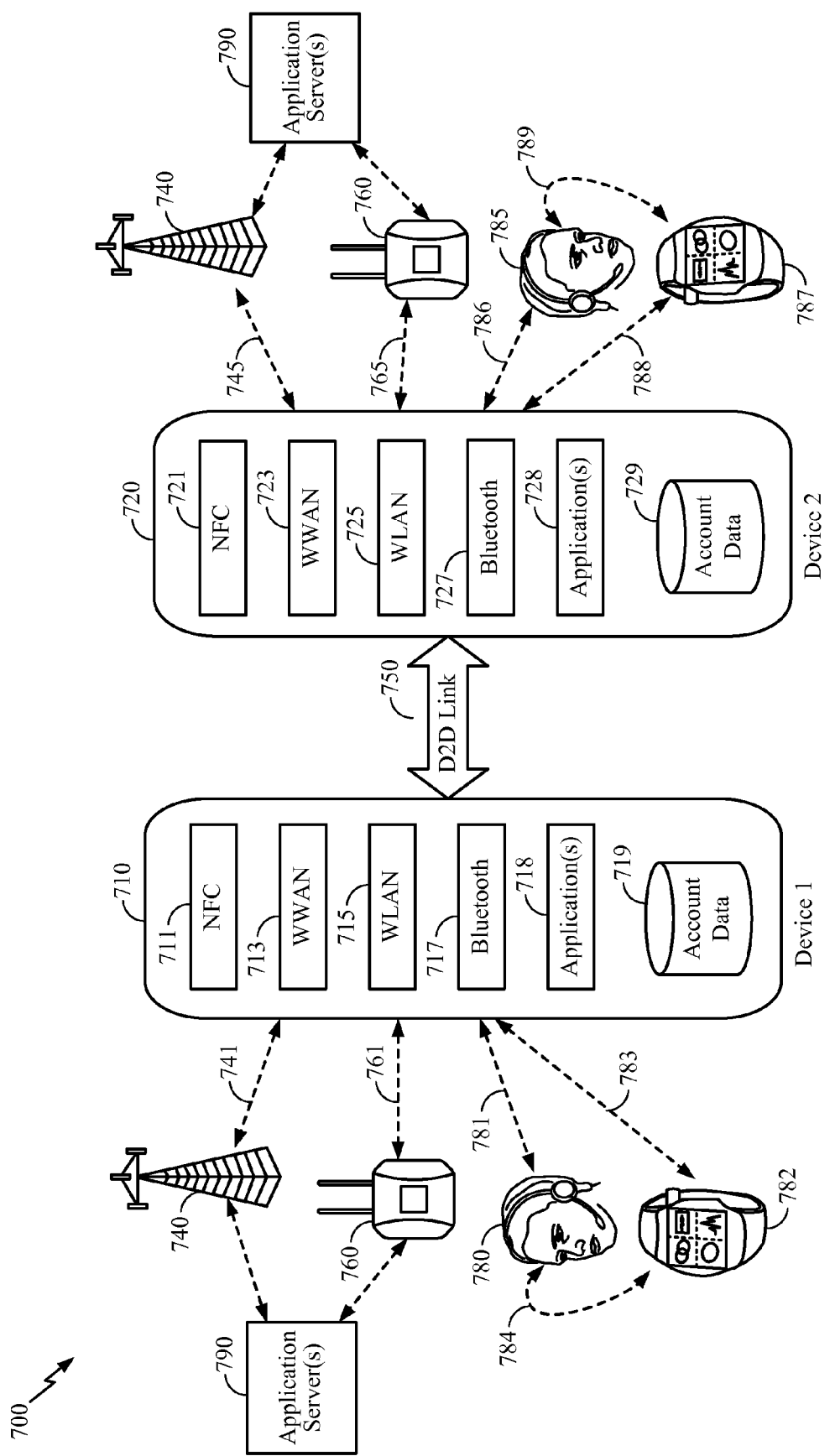
FIG. 7 illustrates an exemplary wireless environment in which two wireless devices may establish and communicate over an out-of-band D2D connection to efficiently synchronize application data, according to various aspects.

According to various aspects, FIG. 7 illustrates an exemplary wireless environment 700 in which two wireless devices 710, 720 may establish and communicate over an out-of-band D2D connection 750 to efficiently synchronize application data in the event that the two wireless devices 710, 720 are located in sufficient proximity to establish the out-of-band D2D connection 750 and either wireless device 710 or wireless device 720 has synchronized the application data with an application server 790 more recently than the other wireless device.

More particularly, as shown in FIG. 7, the wireless device 710 may have a near-field communication (NFC) radio 711, a wireless wide area network (WWAN) radio 713, a wireless local area network (WLAN) radio 715, and a Bluetooth radio 717 that the wireless device 710 can use to communicate within the wireless environment 700. For example, as depicted in FIG. 7, the wireless device 710 can wirelessly communicate with a cellular base station 740 over a WWAN link 741 using the WWAN radio 713. The wireless device 710 can also wirelessly communicate with a Wi-Fi access point 760 over a WLAN link 761 using the WLAN radio 715. Furthermore, the wireless device 710 can wirelessly communicate with a Bluetooth headset 780 and Bluetooth-enabled wearable device 782 over Bluetooth links 781, 783 using the Bluetooth radio 717, wherein the Bluetooth headset 780 and the Bluetooth-enabled wearable device 782 may be in further wireless communication with each other over a Bluetooth link 784. Further still, the wireless device 710 can wirelessly communicate with one or more NFC devices within the "near field" of the wireless device 710 using the NFC radio 711 via magnetic field induction.

Furthermore, according to various aspects, the second wireless device 720 may likewise have multiple radios that each operate in accordance with a different radio access technology. For example, as shown in FIG. 7, the second wireless device 720 may also have an NFC radio 721, a WWAN radio 723, a WLAN radio 725, and a Bluetooth radio 727, wherein the wireless device 720 can use the radios 721, 723, 725, 727 to communicate within the wireless environment 700. For example, as depicted in FIG. 7, the wireless device 720 can wirelessly communicate with a cellular base station 740 over a WWAN link 745 using the WWAN radio 723, with a Wi-Fi access point 760 over a WLAN link 765 using the WLAN radio 725, with a Bluetooth headset 785 and a Bluetooth-enabled wearable device 787 over Bluetooth links 786, 788 using the Bluetooth radio 727, wherein the Bluetooth headset 785 and the Bluetooth-enabled wearable device 787 may be in further wireless communication with each other over a Bluetooth link 789. Further still, the wireless device 720 can wirelessly communicate with one or more NFC devices within the "near field" of the wireless device 720 using the NFC radio 721 via magnetic field induction. Furthermore, those skilled in the art will appreciate that although the wireless devices 710, 720 are depicted in FIG. 7 as communicating with the same cellular base station 740, in which case the WWAN links 741, 745 may have a common endpoint, the wireless devices 710, 720 may in fact be in communication with different cellular base stations via respective WWAN links 741, 745. Analogously, although the wireless devices 710, 720 are depicted in FIG. 7 as communicating with the same Wi-Fi access point 760, those skilled in the art will appreciate that the wireless devices 710, 720 may in fact be in communication with different Wi-Fi access points via respective WLAN links 761, 765.

According to various aspects, in addition to the WWAN links 741, 745 that the wireless devices 710, 720 use to communicate with the cellular base station 740 and the WLAN links 761, 765 that the wireless devices 710, 720 use to communicate with the Wi-Fi access point 760, the wireless devices 710, 720 may communicate with one another directly over an out-of-band D2D connection 750 in the event that the wireless devices 710, 720 are located in sufficient proximity to one another. For example, when the wireless devices 710, 720 are within a range up to approximately 500 meters, the wireless devices 710, 720 may use the WWAN radios 713, 723 to form a D2D link over LTE Direct. Furthermore, if the wireless devices 710, 720 are within sufficient range to discover one another via the WLAN radios 715, 725, the wireless devices 710, 720 may form a D2D link over Wi-Fi Direct. In other examples, the wireless devices 710, 720 may form a D2D link using the Bluetooth radios 717, 727 if the wireless devices 710, 720 are within an operating range ranging from a few meters to a few tens of meters or using the NFC radios 711, 721 if the wireless devices 710, 720 are within each other's near field (e.g., about ten centimeters or less). However, in the event that the wireless devices 710, 720 are both associated with the same user and run respective applications 718, 728 (e.g., an email application) that are associated with the same user name and credentials, existing synchronization algorithms and implementations typically involve each wireless device 710, 720 individually performing a synchronization procedure with a corresponding application server 790 without utilizing or considering the fact that the latest account data 719, 729 associated with the application 718, 728 may be available on the other device in proximity, which tends to be an inefficient approach for several reasons.

As such, in the use case illustrated in FIG. 7, the wireless devices 710, 720 may be assumed to both belong to the same user, support direct D2D communication (e.g., via LTE-Direct using WWAN radios 713, 723, via Wi-Fi Direct using WLAN radios 715, 725, etc.), and both wireless devices 710, 720 have the same application 718, 728 installed and logged into the application server 790 with the same user credentials. Further assuming that the first wireless device 710 has performed a synchronization procedure with the application server 790 more recently than the second wireless device 720, inefficiencies may result if the second wireless device 720 also synchronizes data associated with the application 728 running thereon through the application server 790 using WWAN link 745 and/or WLAN link 765 rather than utilizing or considering the more recently synchronized application data 719 available on the first wireless device 710 located in proximity thereto. For example, if the second wireless device 720 were to utilize the WWAN link 745 to synchronize the application account data 729 through the application server 790, resources may be unnecessarily consumed in the cellular access network, the second wireless device 720 may suffer lower data speeds depending on the load in the cellular access network, consume more power due to the need to transmit at a higher power to close the loop with the cellular base station 740, and so on. Likewise, if the second wireless device 720 were to communicate with the Wi-Fi access point 760 to synchronize the application data 729 through the application server 790 via the legacy WLAN link 765, the second wireless device 720 may have to deal with higher round-trip time (RTT) delays, lower data speeds depending on backhaul congestion, and so on. Accordingly, as will be described in further detail herein, the above-mentioned inefficiencies may be alleviated via synchronizing the application data 729 at the second wireless device 720 over an out-of-band D2D connection 750 with the first wireless device 710 rather than via legacy cellular link 745 and/or legacy Wi-Fi link 765, which may improve performance at the second wireless device 720, reduce backhaul congestion and loading in the cellular and/or Wi-Fi access networks, and allow other users in the same cellular and/or Wi-Fi access network to achieve higher throughput.

For example, according to various aspects, assume that the second wireless device 720 initiates a procedure to synchronize the account data 729 associated with the application 728 running thereon and the second wireless device 720 has 50 MB to download from the application server 790 in order to perform successful synchronization because the last known update was performed about one hour earlier. In this example, the first wireless device 710 in proximity to the second wireless device 720 may be further assumed to have performed the procedure to synchronize the account data 719 associated with the application 718 running thereon with the application server 790 more recently, whereby the account data 719 stored on the first wireless device 710 is currently up-to-date (or at least more current than the account data 729 stored on the second wireless device 720). As such, under current synchronization algorithms, the second wireless device 720 would download the entire 50 MB from the application server 790 via WWAN link 745 and/or WLAN link 765, which in turn utilizes cellular and/or Wi-Fi network resources without utilizing or considering the more recent account data 719 available at the first wireless device 710 that performed the synchronization procedure more recently. As such, according to various aspects described herein, the second wireless device 720 may utilize the out-of-band D2D connection 750 to intelligently synchronize the account data 729 associated with the local application 728 using the account data 719 stored on the first wireless device 710 (e.g., via an LTE-Direct D2D connection 750 formed between the WWAN radios 713, 723, a Wi-Fi Direct D2D connection 750 formed between the WLAN radios 715, 725, etc.). As such, the wireless devices 710, 720 may each be configured to broadcast and discover one or more public and/or private "expressions" that encapsulate an identifier associated with the application 718, 728, a user name and credentials associated with the application 718, 728, and a last update time associated with the account data 719, 729 to determine whether to initiate the synchronization procedure over the out-of-band D2D connection 750.

Accordingly, synchronizing the account data 719, 729 over the out-of-band D2D connection 750 may avoid otherwise inefficient procedures to synchronize the account data 719, 729 using cellular links 741, 745 and/or Wi-Fi links 761, 765 to communicate with the application server 790, which may further add value to the WWAN radios 713, 723, WLAN radios 715, 725, and/or other radios that support D2D communication in addition to reducing the overhead that may result when using network resources to synchronize the account data 719, 729 and allow higher data speeds with reduced RTT delays. As such, allowing the wireless devices 710, 720 to synchronize the account data 719, 729 over the out-of-band D2D connection 750 may ensure better performance with minimal power and resource consumption, which may benefit the wireless devices 710, 720, other end users that do not have to compete with the wireless devices 710, 720 for bandwidth or other network resources, network operators and/or service providers that may have less traffic and backhaul congestion due to offloading the synchronization traffic to the out-of-band D2D connection 750, etc. Furthermore, all interested parties may benefit from the fact that transmit (Tx) power requirements to synchronize the account data 719, 729 may be reduced such that network interference may be reduced, the wireless devices 710, 720 may consume less battery power, and so on. In addition, the wireless devices 710, 720 may have the ability to revert to using the legacy cellular links 741, 745 and/or the legacy Wi-Fi links 761, 765 to facilitate synchronizing the account data 719, 729 via the application server 790 in the event that synchronization over the D2D connection 750 fails, times out, etc.

Figure 8:
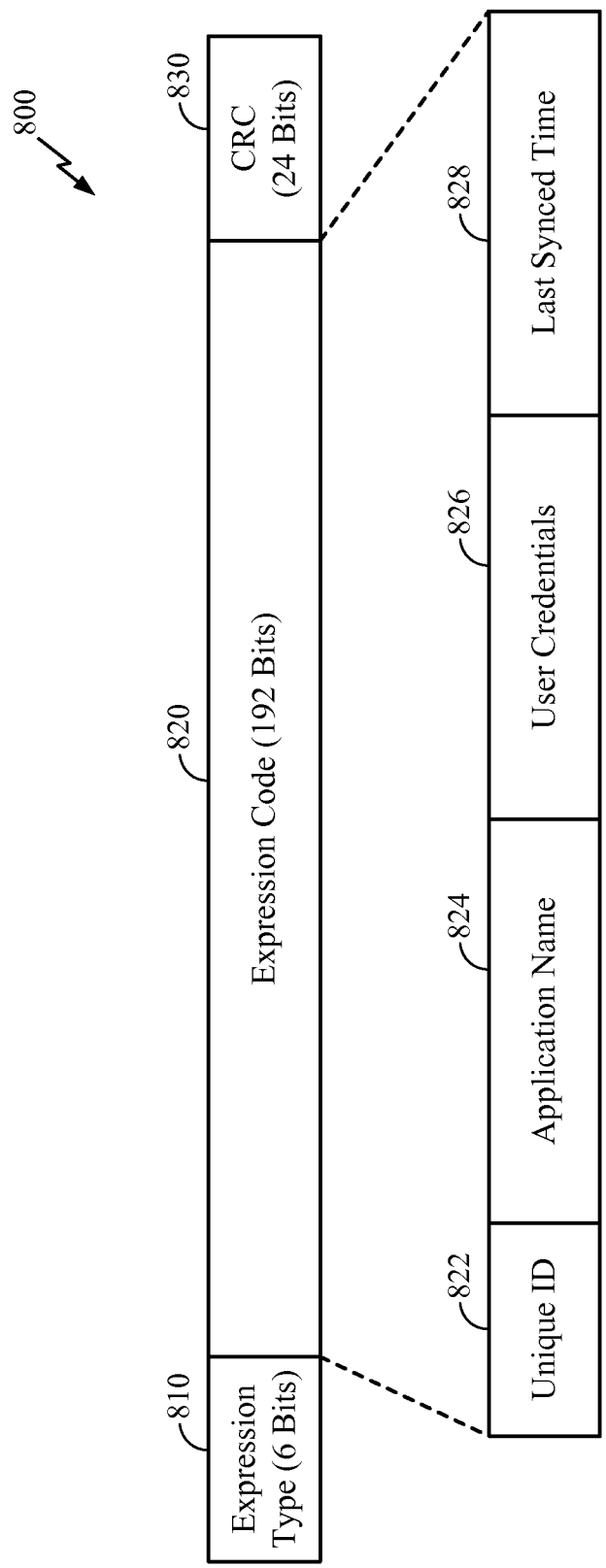
FIG. 8 illustrates an exemplary expression that wireless devices may broadcast and discover to efficiently synchronize application data over an out-of-band D2D connection with a peer wireless device, according to various aspects.

As such, according to various aspects, FIG. 8 illustrates an exemplary expression 800 that wireless devices may broadcast and discover to efficiently synchronize application data over an out-of-band D2D connection with a peer wireless device. In general, the following description may refer to the exemplary expression 800 in a context that relates to an LTE-Direct expression to simplify the discussion provided herein. However, those skilled in the art will appreciate that the structure and characteristics associated with the expression 800 shown in FIG. 8 and described in further detail herein may be readily adapted to other D2D radio access technologies (e.g., Wi-Fi Direct).

According to various aspects, as described above, LTE Direct (LTE-D, sometimes referred to as "LTE-Advanced") is a proposed 3GPP (Release 12) device-to-device (D2D) solution for proximate discovery. LTE-D dispenses with location tracking and network calls by directly monitoring for services on other LTE-D devices within a large range (~500 m, line of sight), doing so continuously in a synchronous system that offers battery efficiency and the ability to concurrently detect thousands of services in proximity. LTE-D has a wider range than other D2D P2P technologies, such as Wi-Fi Direct (WFD) or Bluetooth, and operates on licensed spectrum as a service to mobile applications. LTE-D is a D2D solution that enables service layer discovery and also D2D communication, wherein mobile applications on LTE-D devices can instruct LTE-D to monitor for mobile application services on other devices and announce locally available services (for detection by services on other LTE-D devices) at the physical layer, which allows the applications to close while LTE-D does the work in a substantially continuous manner and notifies the client application when a match to a "monitor" established by an associated application is detected. For example, the application can establish a monitor for "synchronization events" and the LTE-D discovery layer can wake-up the application when a synchronization-related LTE-D expression is detected. LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

LTE-D generally uses "expressions" to both discover proximate peers and facilitate communication between proximate peers. In LTE-D, expressions at the application layer and/or the service layer are referred to as "expression names" (e.g., ShirtSale@Gap.com, Jane@Facebook.com, etc.), wherein expression names at the application layer and/or the service layer are mapped to bit-strings referred to as "expression codes" at the physical layer. In one example, each expression code can have a 192-bit length (e.g., "11001111 . . . 1011", etc.). As will be appreciated, any reference to a particular expression can refer to the associated expression name, expression code, or both, depending on context, and furthermore, expressions can be either private or public based on the mapping type. As such, public expressions are made public and can be identified by any application, whereas private expressions are targeted for specific audiences. Discovery in LTE-D operates in a synchronous manner based on parameters that are configured by the LTE network. For example, frequency division duplexing (FDD) and/or time division duplexing (TDD) may be assigned by a serving eNB via a Session Information Block (SIB). The serving eNB can also configure an interval at which LTE-D devices to are announce themselves (e.g., every 20 seconds, etc.) via transmission of a Service Discovery (or P2P Discovery) message. For example, for a 10 MHz FDD system, the eNB can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

In at least one embodiment, after two or more LTE-D devices discover each other and wish to establish an LTE-D session for communication, the LTE network may be required to authorize establishment of the LTE-D session, referred to herein as network assisted connection setup. If the LTE network authorizes the LTE-D session, the actual media is exchanged via D2D communication between the LTE-D devices, wherein peer devices that have LTE-D capabilities may use expressions to discover proximate services, applications, and context and establish direct D2D communication in an efficient manner.

As such, according to various aspects, FIG. 8 illustrates an exemplary structure associated with an LTE-D expression 800 that two or more LTE-D devices may broadcast such that the LTE-D devices can discover one another and establish an appropriate out-of-band D2D connection that comprises an LTE-D session. In various embodiments, each LTE-D device may broadcast and/or discover the LTE-D expression 800 at periodic intervals (e.g., every twenty (20) seconds), wherein the serving eNB(s) associated therewith may configure the periodic interval via a Service Discovery message, a P2P Discovery message, or another suitable message. In various embodiments, as shown in FIG. 8, the LTE-D expression 800 may include an expression type field 810 having six (6) bits, an expression code field 820 having 192 bits, and a cyclic redundancy check (CRC) field 830 having twenty-four (24) bits. In general, the expression type field 810, the expression code field 820, and the CRC field 830 may be encoded as a single coding block through a convolutional encoder. Furthermore, in various embodiments, the expression code field 820 may comprise a Unique Identifier 822 associated with the broadcasting LTE-D device and one or more content fields that can include other suitable data.

For example, in the use case described above where two wireless devices located in sufficient proximity to one another form a D2D connection to synchronize data associated with an application using the same user name and user credentials, the content fields in the LTE-D expression 800 shown in FIG. 8 may include an application name 824 used to identify the particular application, a user credentials field 826 that includes the user credentials associated with the application, and a last synced time field 828 that indicates the last time at which the wireless device broadcasting the expression 800 synchronized the data associated with the application. As such, other peer wireless devices in proximity may discover the broadcasted LTE-D expression 800 and determine whether any nearby devices has more current synchronization data associated with the application, in which case the discovering wireless device and the broadcasting wireless device may form an appropriate D2D connection and synchronize the application data over the D2D connection rather than communicating over legacy cellular and/or Wi-Fi network to synchronize the application data through an application server located on a network.

Figure 9A:
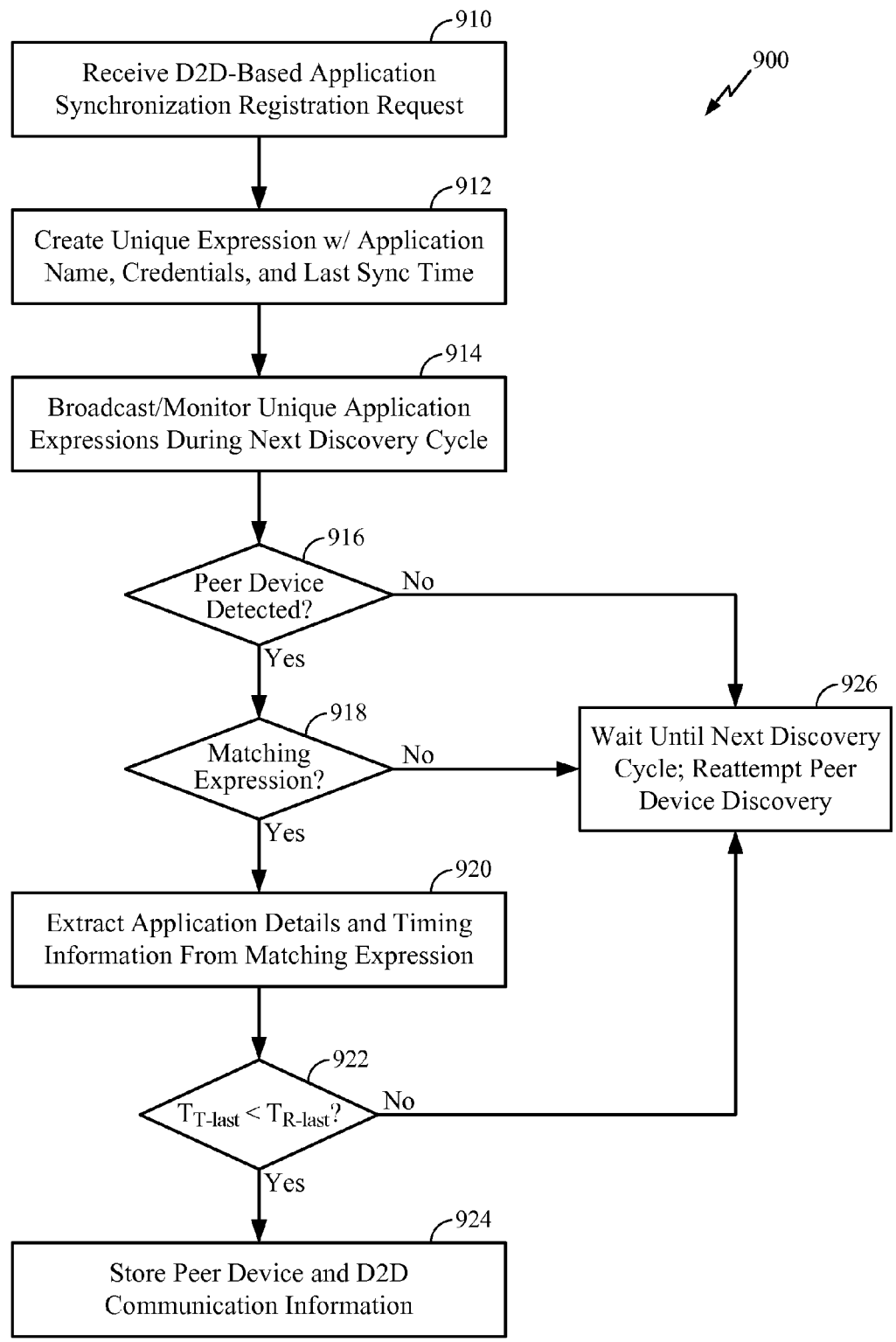
FIG. 9A-9B illustrates an exemplary synchronous procedure that a wireless device may perform to synchronize application data over an out-of-band D2D connection with a peer wireless device, according to various aspects.
Figure 9B:
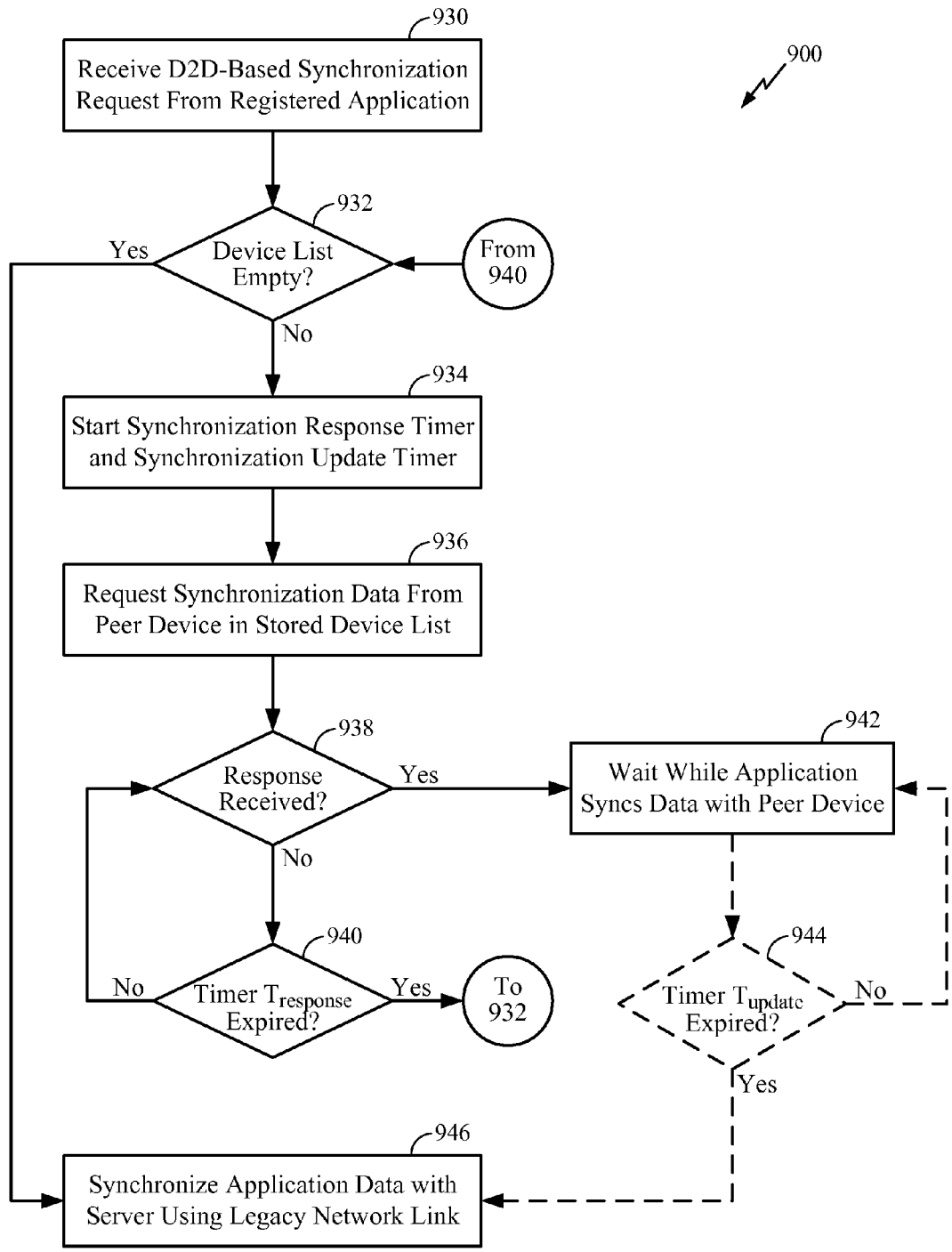

According to various aspects, FIG. 9A-9B illustrates an exemplary synchronous procedure 900 that a wireless device may perform to synchronize application data over an out-of-band D2D connection with a peer wireless device. More particularly, at block 910, a request to register for D2D-based application synchronization may be received from one or more applications running on the wireless device, wherein only those applications that have registered for the D2D-based application synchronization may be allowed to synchronize data associated therewith over an out-of-band D2D connection. According to various aspects, the wireless device may then create a local unique expression associated with the registered application at block 912, wherein the local unique expression may comprise at least a name, one or more user credentials, and a last time at which data associated with the application was synchronized with the network application server. The wireless device may then add the local unique expression to a unique expression list that includes the local unique expressions associated with each application that has registered for the D2D-based application synchronization, which may be optionally stored in cache memory for faster access. The wireless device may then broadcast each local unique expression in the unique expression list during the next discovery cycle at block 914, and the wireless device may further monitor for expressions that one or more other wireless devices in proximity broadcast during the next discovery cycle.

In various embodiments, the wireless device may then determine whether any potential peer devices were detected at block 916. In the event that no potential peer devices were detected, at block 926, the wireless device may wait until the next discovery cycle to again broadcast each local unique expression in the unique expression list and monitor for expressions that one or more other wireless devices in proximity broadcast to thereby reattempt the peer device discovery process. However, in the event that one or more potential peer devices are detected at block 916, the wireless device may then maintain information associated with the unique expressions that were discovered during the discovery cycle, compare the unique expressions received from the other peer device(s) with the local unique expressions in the unique expression list stored at the wireless device, and determine whether any unique expression(s) received from a potential peer device matches any local unique expressions in the unique expression list at block 918. In the event that no matches are found between the unique expression(s) received from the potential peer devices and the local unique expressions in the unique expression list, the wireless device may wait until the next discovery cycle to again broadcast each local unique expression in the unique expression list and monitor for expressions that one or more other wireless devices in proximity broadcast to thereby reattempt the peer device discovery process at block 926. However, in response to finding at least one any unique expression(s) received from a potential peer device that matches a local unique expression in the unique expression list, the wireless device may then extract details associated with the application and relevant timing information from the matching expression at block 920. For example, according to various aspects, the extracted details associated with the application may include at least the name and user credentials, which may be checked to ensure that the application name and user credentials match the registered application on the wireless device. In addition, the relevant timing information may comprise a last time ($T_{T\text{-}last}$) at which the transmitting device performed a synchronization procedure or other suitable procedure to obtain updated data from the application server on the network.

According to various aspects, where the application details extracted from the matching expression indicate the same application name and user credentials associated with an application that has registered for the D2D-based account synchronization service, the wireless device may then compare the last time ($T_{T\text{-}last}$) at which the transmitting device performed the synchronization procedure with the network application server to the last time ($T_{R\text{-}last}$) at which the receiving wireless device performed the synchronization procedure with the network application server at block 922. As such, in response to determining at block 922 that the transmitting device performed the synchronization procedure with the network application server more recently than the receiving wireless device (i.e., $T_{T\text{-}last}$ is less than $T_{R\text{-}last}$), the wireless device may store information associated with the peer device and information suitable to establish a D2D connection with the peer device at block 924. For example, in various embodiments, the wireless device may add the information associated with the peer device, the information suitable to establish a D2D connection with the peer device, and the name and user credentials corresponding to the application associated with the matching expressions to a suitable device list. The wireless device may then reference the suitable device list, which may be optionally stored in cache memory for faster access, in order to quickly establish the D2D connection when needed (e.g., in response to the application automatically initiating the synchronization procedure, the user manually initiating the synchronization procedure, etc.). However, in response to determining at block 922 that the receiving device performed the synchronization procedure with the network application server at substantially the same time or more recently than the receiving wireless device (i.e., $T_{T\text{-}last}$ is equal to or greater than $T_{R\text{-}last}$), the wireless device may wait until the next discovery cycle and reattempt the peer device discovery process during the next discovery cycle at block 926.

Referring now to FIG. 9B, at some subsequent point in time, the wireless device may receive a D2D-based account synchronization request from the registered application at block 930. For example, in various embodiments, the application may automatically initiate the synchronization procedure (e.g., at periodic intervals, based on some triggering event, etc.), or the user may manually initiate the synchronization procedure. In either case, the wireless device may then determine whether the suitable device list stored on the wireless device is empty at block 932, in which case the application data may simply be synchronized with the network application server using a legacy cellular and/or Wi-Fi link at block 946 (e.g., because there are no suitable peer devices in proximity that performed the synchronization procedure with the network application server more recently). On the other hand, in response to determining at block 932 that the suitable device list is not empty, the wireless device may select the first suitable peer device from the list and attempt to synchronize the application data over a D2D connection with the selected peer device.

More particularly, in attempting to synchronize the application data over a D2D connection with the selected peer device, the wireless device may start a synchronization update timer ($T_{update}$) and a synchronization response timer ($T_{response}$) at block 934, wherein the synchronization update timer and the synchronization response timer may comprise real-time timers, timers based on a system clock, and/or any other suitable timer or combination of timers, as will be apparent to those skilled in the art. The wireless device may then send a synchronization request to the peer device selected from the suitable device list stored on the wireless device at block 936 and determine whether a response has been received from the selected peer device at block 938. Where no response has been received from the selected peer device, the wireless device may then determine whether the synchronization response timer ($T_{response}$) has expired at block 940, in which case the method 900 may return to block 932. At that point, the wireless device may either synchronize the application data with the network application server using the legacy cellular and/or Wi-Fi link at block 946 if the suitable device list is empty or select the next suitable peer device from the suitable device list and attempt to synchronize the application data over a D2D connection with the next suitable peer device in the same manner as described herein. However, in response to determining that the synchronization response timer ($T_{response}$) has not expired at block 940, the wireless device may again check whether a response was received at block 938 and the method 900 may loop through blocks 938, 940 until either a response is received or the synchronization response timer ($T_{response}$) expires.

Accordingly, assuming that the wireless device receives a response from the currently selected peer device, the wireless device may then wait while the application attempts to synchronize the application data over the D2D connection with the peer device at block 942. Once the synchronization procedure successfully downloads the most recent updated application data over the D2D connection with the peer device, the method 900 may appropriately end. However, while waiting for the application to complete the synchronization procedure over the D2D connection, the wireless device may periodically check whether the synchronization update timer ($T_{update}$) has expired at block 944, in which case the wireless device may synchronize the application data with the network application server. However, in response to determining that the synchronization update timer ($T_{update}$) has not expired at block 944, the wireless device may continue to wait while the application synchronizes the data over the D2D connection with the peer device at block 942 and the method 900 may loop through blocks 942, 944 until the D2D-based synchronization procedure completes or the synchronization update timer ($T_{update}$) expires.

Figure 10A:
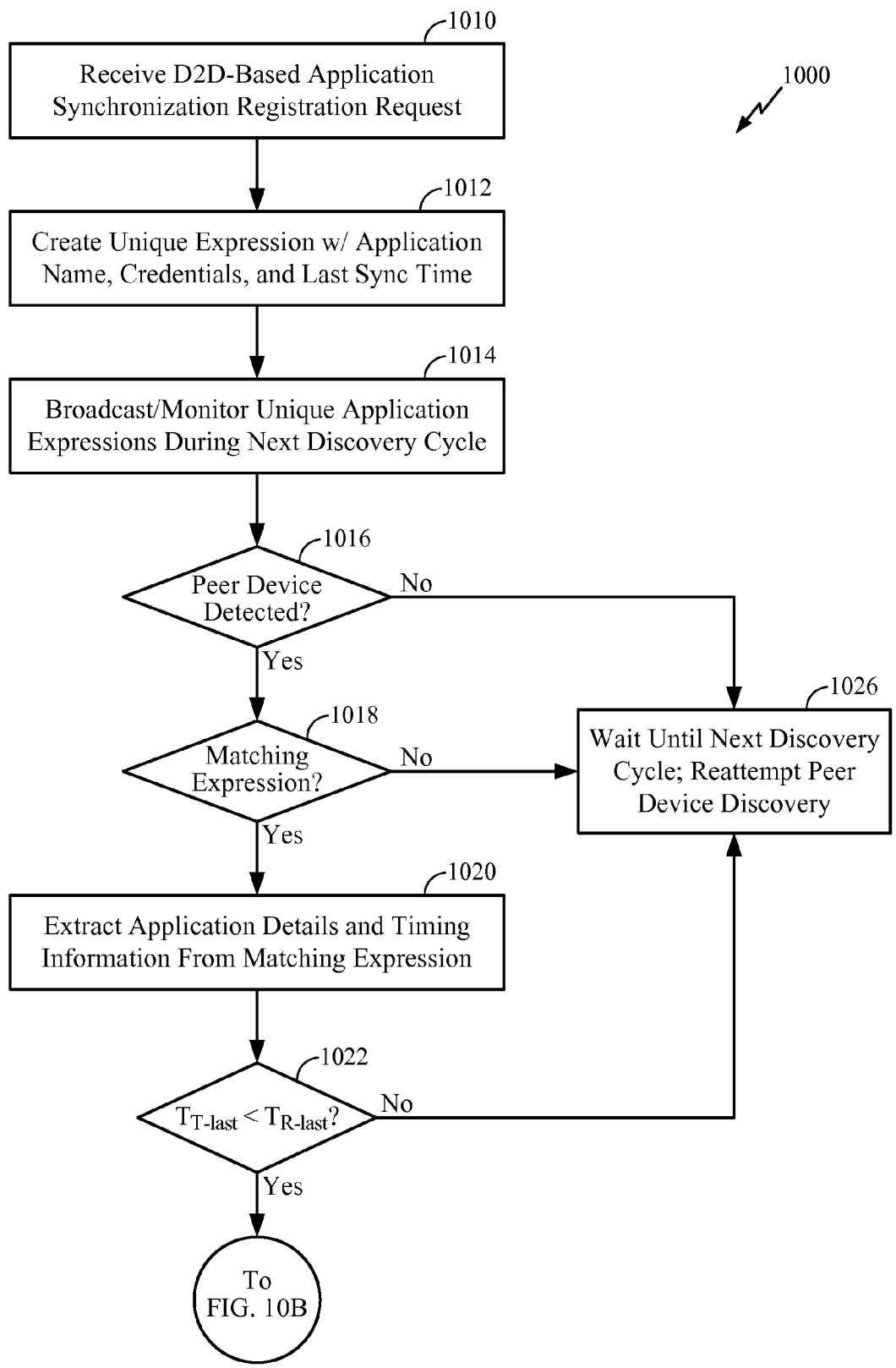
FIG. 10A-10B illustrates an exemplary asynchronous procedure that a wireless device may perform to synchronize application data over an out-of-band D2D connection with a peer wireless device, according to various aspects.
Figure 10B:
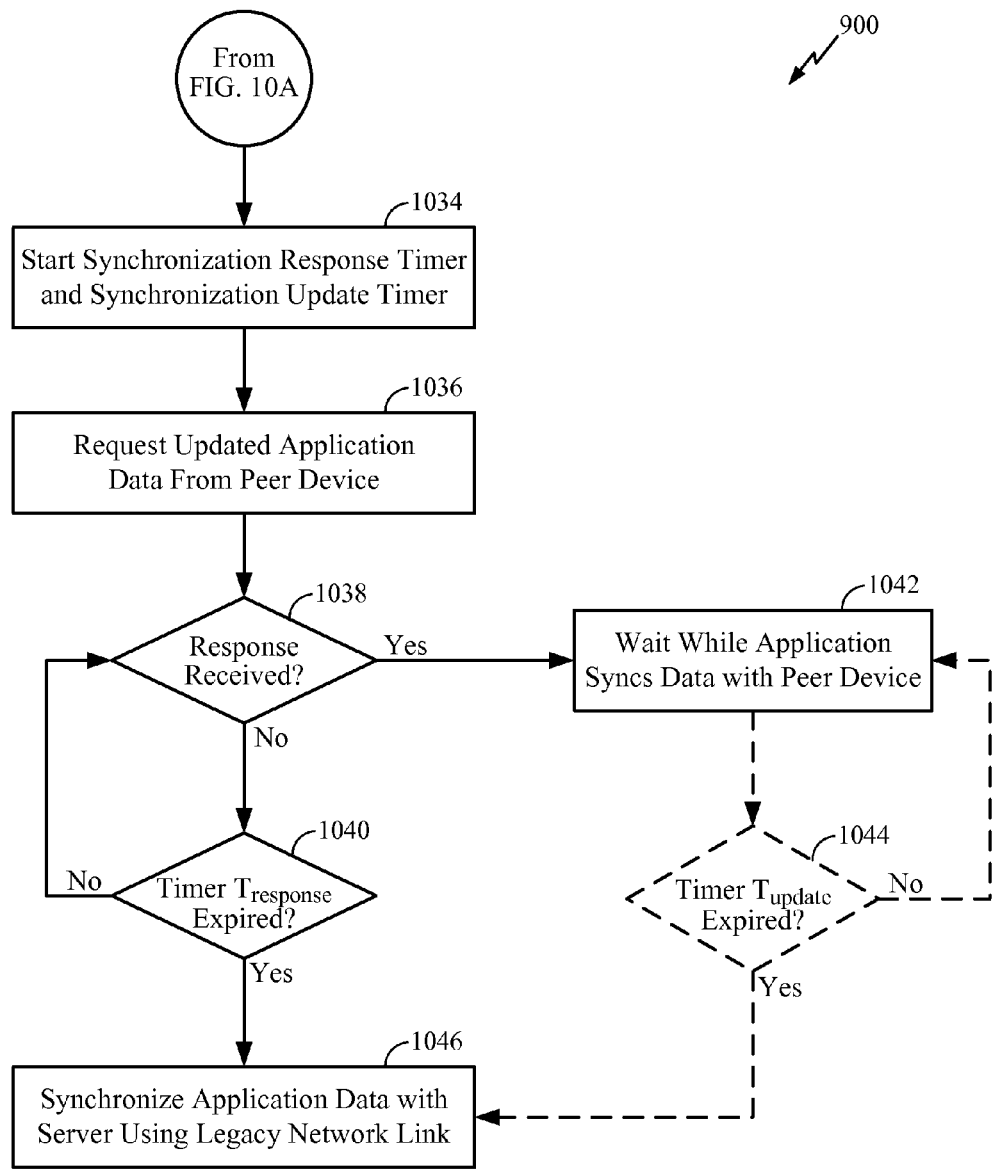

According to various aspects, FIG. 10A-10B illustrates an exemplary asynchronous procedure 1000 that the wireless device may perform to synchronize application data over an out-of-band D2D connection with a peer wireless device. In general, the asynchronous procedure 1000 may be substantially similar to the synchronous procedure described above, except that the wireless device may attempt to synchronize the application data upon discovering a potential suitable peer device rather than iterating through the suitable device list after receiving an explicit synchronization request from the application and/or the user. More particularly, at block 1010, the wireless device may similarly receive a request to register for D2D-based application synchronization from one or more applications running on the wireless device, wherein only those applications that have registered for the D2D-based application synchronization may be allowed to synchronize data associated therewith over an out-of-band D2D connection. According to various aspects, the wireless device may then create the local unique expression associated with the registered application at block 1012, which may comprise at least a name, one or more user credentials, and a last time at which data associated with the application was synchronized with the network application server. The wireless device may then add the local unique expression to a unique expression list that includes the local unique expressions associated with each application that has registered for the D2D-based application synchronization, which may be optionally stored in cache memory for faster access. The wireless device may then broadcast each local unique expression in the unique expression list during the next discovery cycle at block 1014, and the wireless device may further monitor for expressions that other wireless devices in proximity broadcast during the next discovery cycle.

In various embodiments, the wireless device may then determine whether any potential peer devices were detected at block 1016. In the event that no potential peer devices were detected, at block 1026, the wireless device may wait until the next discovery cycle to again broadcast each local unique expression in the unique expression list and monitor for expressions that one or more other wireless devices in proximity broadcast to thereby reattempt the peer device discovery process. However, in the event that one or more potential peer devices are detected at block 1016, the wireless device may track the unique expressions discovered during the discovery cycle, compare the unique expressions received from the other peer device(s) during the discovery cycle with the local unique expressions in the unique expression list, and determine whether any unique expression(s) received from a potential peer device matches any local unique expressions in the unique expression list at block 1018. In the event that no matches are found between the unique expression(s) received from the potential peer devices and the local unique expressions in the unique expression list, the wireless device may wait until the next discovery cycle to again broadcast each local unique expression in the unique expression list and monitor for expressions that one or more other wireless devices in proximity broadcast to thereby reattempt the peer device discovery process at block 1026. However, in response to finding at least one any unique expression(s) received from a potential peer device that matches a local unique expression in the unique expression list, the wireless device may then extract details associated with the application and relevant timing information from the matching expression at block 1020. For example, according to various aspects, the extracted details associated with the application may include at least the name and user credentials, which may be checked to ensure that the application name and user credentials match the registered application on the wireless device. In addition, the relevant timing information may comprise a last time ($T_{T\text{-}last}$) at which the transmitting device performed a synchronization procedure or other suitable procedure to obtain updated data from the application server on the network.

According to various aspects, where the application details extracted from the matching expression indicate the same application name and user credentials associated with an application that has registered for the D2D-based account synchronization service, the wireless device may then compare the last time ($T_{T\text{-}last}$) at which the transmitting device performed the synchronization procedure with the network application server to the last time ($T_{R\text{-}last}$) at which the receiving wireless device performed the synchronization procedure with the network application server at block 1022. As such, in response to determining at block 1022 that the transmitting device performed the synchronization procedure with the network application server more recently than the receiving wireless device (i.e., $T_{T\text{-}last}$ is less than $T_{R\text{-}last}$), the method 1000 may proceed to the flow shown in FIG. 10B, as will be described more fully below. However, in response to determining at block 1022 that the receiving device performed the synchronization procedure with the network application server at substantially the same time or more recently than the receiving wireless device (i.e., $T_{T\text{-}last}$ is equal to or greater than $T_{R\text{-}last}$), the wireless device may wait until the next discovery cycle and reattempt the peer device discovery process during the next discovery cycle at block 1026 in a similar manner to that described above.

Referring now to FIG. 10B, the wireless device may attempt to synchronize the application data over a D2D connection with the peer device that transmitted the expression that matches the application registered for the D2D-based synchronization service and indicates a more recent update time than the receiving wireless device. More particularly, in attempting to synchronize the application data over a D2D connection with the transmitting peer device, the wireless device may start a synchronization update timer ($T_{update}$) and a synchronization response timer ($T_{response}$) at block 1034, wherein the synchronization update timer and the synchronization response timer may comprise real-time timers, timers based on a system clock, and/or any other suitable timer or combination of timers, as will be apparent to those skilled in the art. The wireless device may then request the updated application data from the peer device at block 1036 and determine whether a response has been received from the selected peer device at block 1038. Where no response has been received from the selected peer device, the wireless device may then determine whether the synchronization response timer ($T_{response}$) has expired at block 1040, in which case the wireless device may synchronize the application data with the network application server using the legacy cellular and/or Wi-Fi link at block 1046. However, in response to determining that the synchronization response timer ($T_{response}$) has not expired at block 1040, the wireless device may again check whether a response was received at block 1038 and the method 1000 may loop through blocks 1038, 1040 until either a response is received or the synchronization response timer ($T_{response}$) expires.

Accordingly, assuming that the wireless device receives a response from the peer device at some point prior to the synchronization response timer ($T_{response}$) expiring, the wireless device may then wait while the application attempts to synchronize the application data over the D2D connection with the peer device at block 1042. Once the synchronization procedure successfully downloads the most recent updated application data over the D2D connection with the peer device, the method 1000 may appropriately end. However, while waiting for the application to complete the synchronization procedure over the D2D connection, the wireless device may periodically check whether the synchronization update timer ($T_{update}$) has expired at block 1044. In the event that the synchronization update timer ($T_{update}$) expires at block 1044 prior to the application completing the synchronization procedure over the D2D connection, the wireless device may synchronize the application data with the network application server at block 1046. Otherwise, prior to the synchronization update timer ($T_{update}$) expiring, the method 1000 may loop through blocks 1042, 1044 until the application completes the synchronization procedure with the peer device or the synchronization update timer ($T_{update}$) expires.

Figure 11:
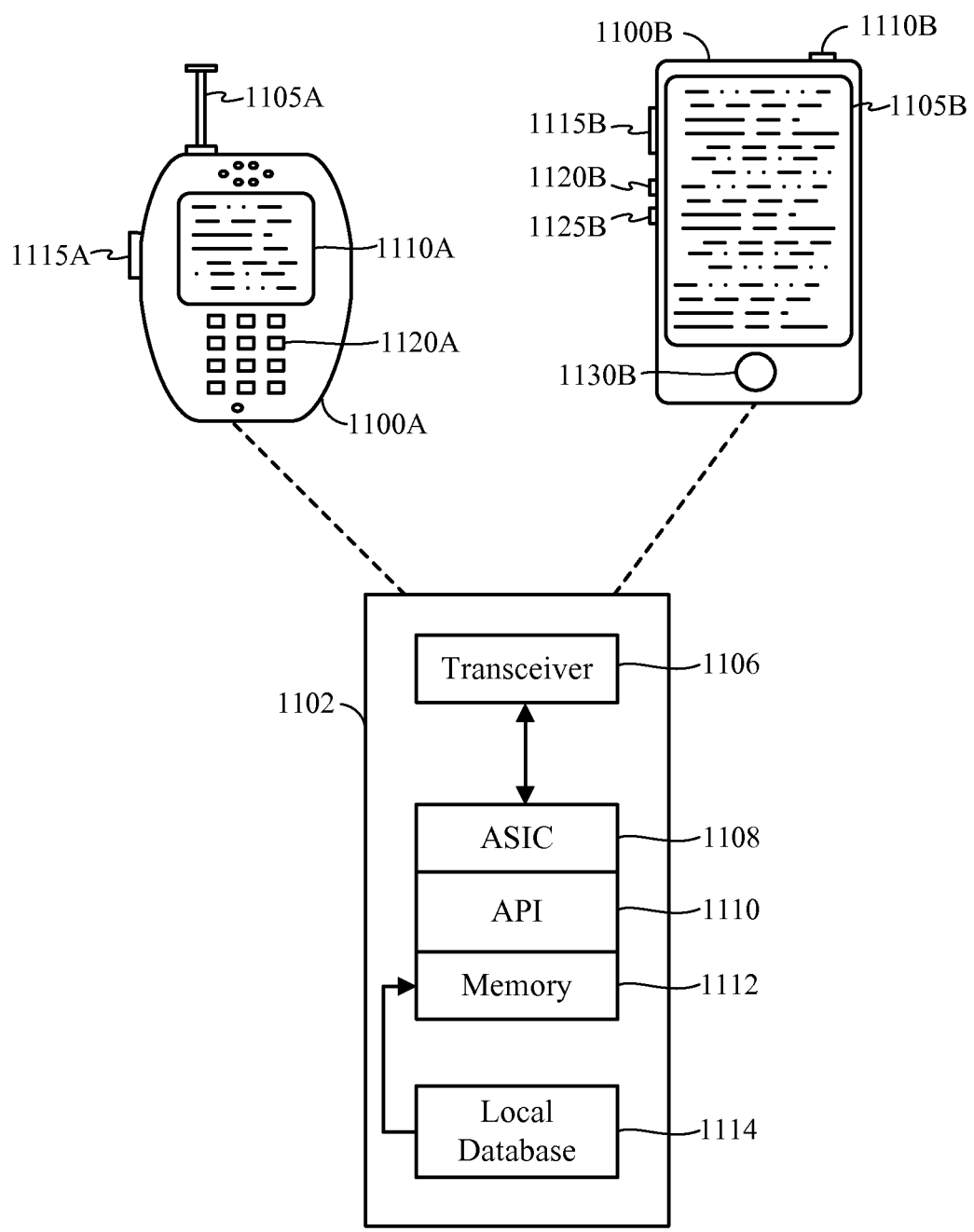
FIG. 11 illustrates exemplary UEs that may support efficient application data synchronization using out-of-band D2D communication, according to various aspects.

According to various aspects, FIG. 11 illustrates exemplary UEs 1100A, 1100B that may support out-of-band D2D communication that can be used to efficiently synchronize application data according to the various aspects and embodiments described herein. Referring to FIG. 11, UE 1100A is illustrated as a mobile telephone and UE 1100B is illustrated as a touchscreen device (e.g., a smart phone, a tablet computer, etc.). As shown in FIG. 11, an external casing of UE 1100A is configured with an antenna 1105A, a display 1110A, at least one button 1115A (e.g., a power button, a volume control button, a PTT button, etc.) and a keypad 1120A, among other components, as known in the art. Also, UE 1100B has an external casing configured with a touchscreen display 1105B, peripheral buttons 1110B, 1115B, 1120B and 1125B (e.g., a power control button, a volume or vibrate control button, an airplane mode toggle button, etc.), at least one front-panel button 1130B (e.g., a Home button, etc.), among other components, as known in the art. Furthermore, although not explicitly shown in FIG. 11, the UE 1100B can include one or more external antennas and/or one or more integrated antennas that may be built into the external casing associated therewith, including but not limited to Wi-Fi antennas, cellular antennas, satellite position system (SPS) antennas (e.g., global positioning system (GPS) antennas), and so on.

While the UEs 1100A, 1100B can have internal components potentially embodied according to different hardware configurations, a basic high-level UE configuration for internal hardware components is shown in FIG. 11 as a platform 1102. In particular, according to various aspects, the platform 1102 can receive and execute software applications, data, and/or commands transmitted from an access network that may ultimately come from the Operator IP Services 140, the Internet, and/or other remote servers and networks (e.g., an application server associated with an application installed on UEs 1100A, 1100B that use the same user name and credentials). The platform 1102 can also independently execute locally stored applications without interacting or communicating with an access network and/or support processing functions that relate to out-of-band D2D communication with another UE located in sufficient proximity thereto. The platform 1102 can include a transceiver 1106 operably coupled to an application specific integrated circuit (ASIC) 1108 or another suitable processor, microprocessor, logic circuit, and/or data processing device. The ASIC 1108 and/or other suitable processor(s) may execute the application programming interface (API) 1110 layer, which may interface with any suitable programs resident in the memory 1112. According to various aspects, the memory 1112 can comprise read-only memory (ROM), random-access memory (RAM), EEPROM, flash cards, and/or any other suitable memory common to computer platforms. The platform 1102 also can include a local database 1114 that can store applications not actively used in memory 1112, as well as other suitable data. The local database 1114 may typically be a flash memory cell, but can be any secondary storage device as known in the art, such as magnetic media, EEPROM, optical media, tape, soft or hard disk, or the like.

Accordingly, one embodiment disclosed herein can include a UE (e.g., UE 1100A, 1100B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 1108, memory 1112, API 1110 and local database 1114 may all be used cooperatively to load, store and execute the various functions disclosed herein and thus the logic to perform these functions may be distributed over various elements. Alternatively, the functionality could be incorporated into one discrete component. Therefore, the features associated with UEs 1100A, 1100B as shown in FIG. 11 are to be considered illustrative only, and the disclosure is not limited to the feature(s) or arrangement(s) illustrated therein.

The wireless communication between the UEs 1100A, 1100B, between the UEs 1100A, 1100B and an access network, and/or between the UEs 1100A, 1100B and other suitable network entities can be based on various different technologies, which may include, without limitation, CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed above and known in the art, voice transmission and/or data can be transmitted to the UEs 1100A, 1100B from an access network using various networks and configurations. Accordingly, the illustrations provided herein are not intended to limit the embodiments disclosed herein and are merely to aid in describing the various aspects and embodiments provided herein.

Figure 12:
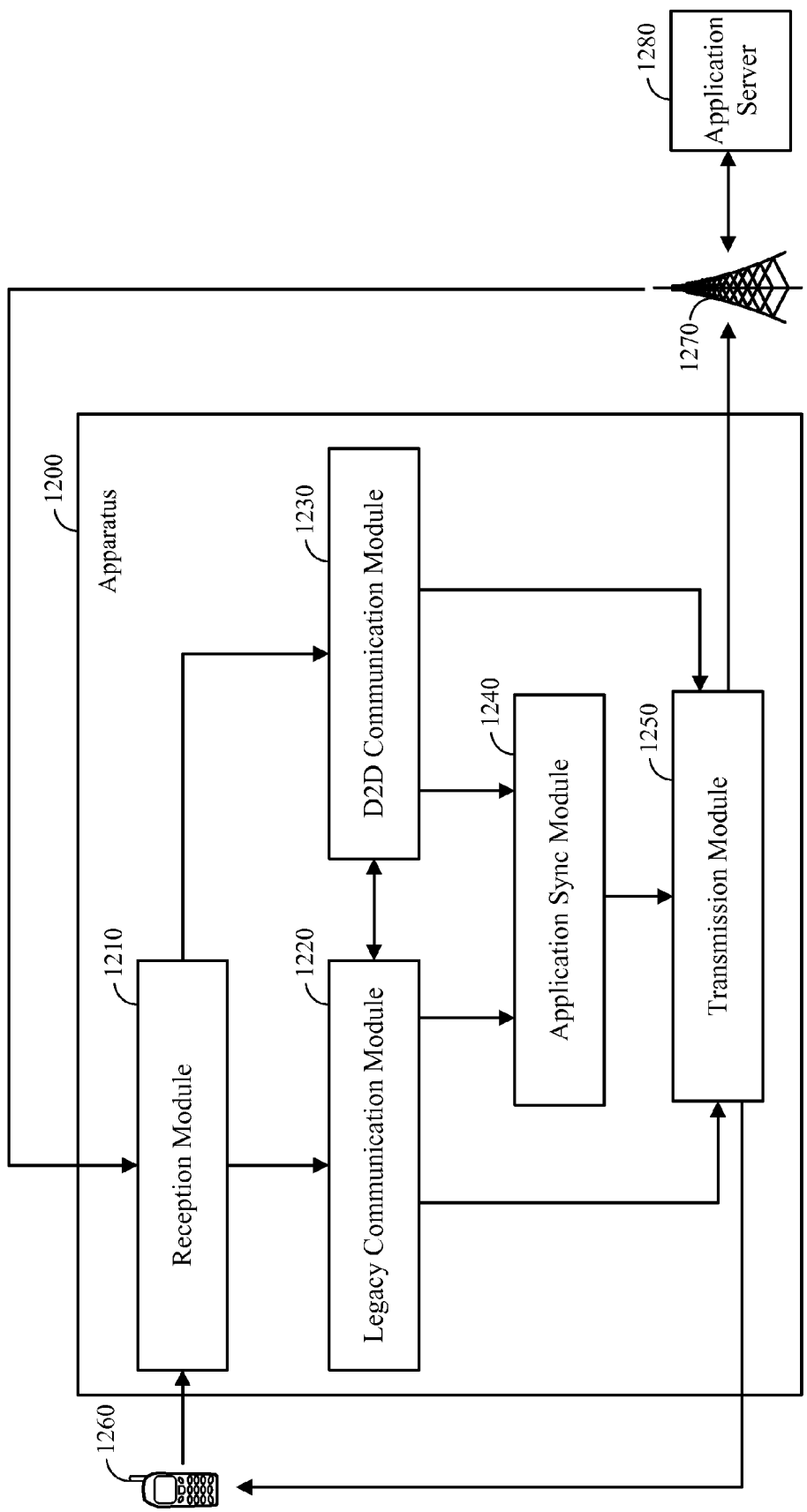
FIG. 12 illustrates an exemplary conceptual data flow between different modules, means, and/or components in an exemplary apparatus that may support efficient application data synchronization using out-of-band D2D communication, according to various aspects.

According to various aspects, FIG. 12 illustrates an exemplary conceptual data flow between different modules, means, and/or components in an exemplary apparatus 1200 that may support efficient application data synchronization using out-of-band D2D communication according to the various aspects and embodiments described herein.

In various embodiments, the apparatus 1200 may include a reception module 1210 that can receive an expression from a second UE 1260, wherein the received expression may include a name associated with an application, one or more user credentials associated with the application, and a last time at which the second UE 1260 synchronized account data associated with the application. In addition, the reception module 1210 may further receive signaling and data from a current base station or other access point 1270 associated with a legacy cellular and/or Wi-Fi link. Accordingly, in response to determining that the expression received from the second UE 1260 matches an application registered for D2D-based account synchronization and further that the expression indicates that the last time at which the second UE 1260 synchronized account data associated with the application is more recent than a last time at which the apparatus 1200 synchronized account data associated with the application, the apparatus 1200 may use a D2D communication module 1230 to establish a D2D connection with the second UE 1260 and attempt to synchronize the application data using the more recent application account data stored on the second UE 1260 over the D2D connection. Alternatively, if the expression received from the second UE 1260 does not match any application registered for D2D-based account synchronization on the apparatus 1200 or the received expression indicates that the last time at which the second UE 1260 synchronized account data associated with the application was not performed more recently than the last time at which the apparatus 1200 synchronized the account data, the apparatus 1200 may use a legacy communication module 1220 to synchronize the application data using the latest data stored on an application server 1280 via the access point 1270. In a further alternative, if the attempt to use the D2D communication module 1230 to synchronize the application data using the more recent application account data stored on the second UE 1260 fails, times out, or is otherwise unsuccessful, the apparatus 1200 may use the legacy communication module 1220 to synchronize the application data using the latest data stored on an application server 1280 via the access point 1270. In various embodiments, the apparatus 1200 may further include a transmission module 1250 that can transmit information associated with the D2D link and/or a legacy link with the access point 1270 directly to the second UE 1260 using the D2D link, and the transmission module 1250 may further transmit information associated with the D2D link and/or the legacy link to the access point 1270 using the legacy link. Furthermore, those skilled in the art will appreciate that the second UE 1260 may include similar components to the apparatus 1200, whereby a D2D connection may be established between the apparatus 1200 and the second UE 1260 to synchronize the application data on the second UE 1260 where the application data stored on the apparatus 1200 was updated more recently than the application data stored on the second UE 1260.

The apparatus 1200 may include additional modules that perform each of the steps of the efficient out-of-band D2D-based application synchronization procedure(s) described above. As such, a module may perform each step in the aforementioned out-of-band D2D-based application synchronization procedure(s) and the apparatus 1200 may include one or more of such modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
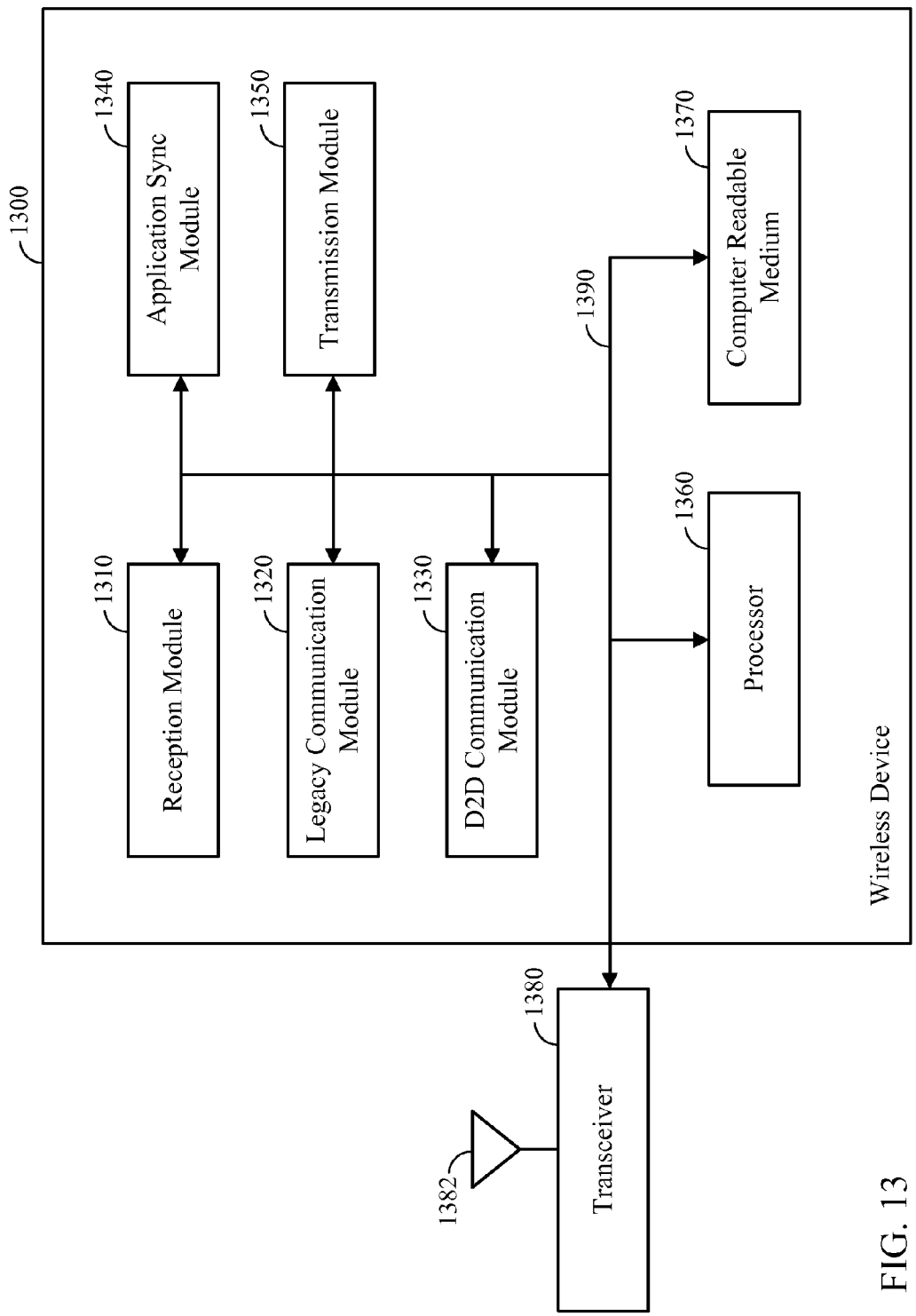
FIG. 13 illustrates an exemplary hardware implementation corresponding to a wireless device that may support efficient application data synchronization using out-of-band D2D communication, according to various aspects.

According to various aspects, FIG. 13 illustrates an exemplary hardware implementation corresponding to a wireless device 1300 that may support efficient application data synchronization using out-of-band D2D communication according to the various aspects and embodiments described herein. In various embodiments, the wireless device 1300 may comprise a processing system implemented with a bus architecture, represented generally by bus 1390. The bus 1390 may include any number of interconnecting buses and bridges depending on the specific application of the wireless device 1300 and the overall design constraints. The bus 1390 links together various circuits including one or more processors and/or hardware modules, represented by the processor 1360, computer-readable medium 1370, reception module 1310, legacy communication module 1320, D2D communication module 1330, application sync module 1340, and transmission module 1350. The bus 1390 may also link various other circuits such as timing sources, peripherals, voltage regulators, and power management circuits, which are well known in the art, and therefore, will not be described any further.

In various embodiments, the wireless device 1300 may further comprise a transceiver 1380, which may be coupled to one or more antennas 1382. The transceiver 1380 may provide a means (e.g., an LTE Direct modem, a Wi-Fi Direct modem, etc.) for communicating with various other apparatuses over a transmission medium. The wireless device 1300 includes a processor 1360 coupled to the computer-readable medium 1370, wherein the processor 1360 may be responsible for general processing, including the execution of software stored on the computer-readable medium 1370. The software, when executed by the processor 1360, may cause the processor 1360 to perform the various functions described in further detail above for any particular apparatus. The computer-readable medium 1370 may also be used to store data that the processor 1360 can then manipulate when executing software. The wireless device 1300 further includes at least one of the reception module 1310, the legacy communication module 1320, the D2D communication module 1330, the application sync module 1340, and the transmission module 1350. The modules may be software modules running in the processor 1360, resident/stored in the computer readable medium 1370, one or more hardware modules coupled to the processor 1360, or some combination thereof. The wireless device may further correspond to a UE and may include other suitable components as described herein (e.g., a memory, TX processor, RX processor, controller/processor, etc. as shown in connection with the UE 610 in FIG. 6).

In various embodiments, the apparatus 1000 shown in FIG. 10 and the wireless device 1100 shown in FIG. 11 may include means for generating a local unique expression that includes a name, one or more user credentials, and a last update time associated with an application registered for a device-to-device (D2D) based application data synchronization service, means for detecting one or more external unique expressions received from one or more other devices in proximity to the first device that match the registered application, means for identifying, among the one or more other devices, an update device associated with an external unique expression that includes a last update time more recent than the last update time associated with the local unique expression, and means for requesting an update to synchronize the application data associated with the registered application from the update device over an out-of-band D2D connection. In various embodiments, the above-mentioned means may be one or more of the aforementioned modules of the UEs 1100A, 1100B shown in FIG. 11, the apparatus 1200 shown in FIG. 12, and/or the wireless device 1300 shown in FIG. 13 that are configured or configurable to perform the functions recited in connection with the aforementioned means. As mentioned above, the wireless device may further include certain components associated with the UE 610 shown in FIG. 6, whereby in one example, the above-mentioned means may comprise the TX Processor 668, the RX Processor 656, the controller/processor 659, and/or other components associated with the UE 610 that are configured or configurable to perform the functions recited in connection with the above-mentioned means.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination thereof. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, those skilled in the art will appreciate that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for device-to-device (D2D) application synchronization, comprising:
    generating, at a first device, a local unique expression that includes a name, one or more user credentials, and a last update time associated with an application registered for a D2D-based application data synchronization service;
    detecting, at the first device, one or more external unique expressions that are received from one or more peer devices in proximity to the first device and match the name and the one or more user credentials associated with the registered application;
    identifying, among the one or more peer devices, an update device associated with an external unique expression that includes a last update time more recent than the last update time associated with the local unique expression; and
    requesting an update to synchronize the application data associated with the registered application from the update device over an out-of-band D2D connection.

2. The method recited in claim 1, further comprising:
    starting one or more timers upon requesting the update to synchronize the application data over the D2D connection; and
    synchronizing the application data using updated data received from the update device over the D2D connection while the one or more timers have not expired.

3. The method recited in claim 2, further comprising:
    synchronizing the application data associated with the registered application from a network server in response to determining that the one or more timers have expired.

4. The method recited in claim 1, wherein the update to synchronize the application data is requested from the update device upon discovering the external unique expression that includes the more recent last update time.

5. The method recited in claim 1, further comprising:
    maintaining a D2D device list at the first device, wherein the D2D device list comprises one or more potential update devices from which an external unique expression matching the name and the one or more user credentials associated with the registered application was received; and adding the update device to the D2D device list maintained at the first device.

6. The method recited in claim 5, wherein requesting the update to synchronize the application data associated with the registered application further comprises:
selecting the update device from the D2D device list;
starting a response timer and an update timer upon requesting the update to synchronize the application data from the update device; and
synchronizing the application data using updated data received from the update device over the D2D connection while the update timer has not expired if the update device responds to the update request before the response timer expires.

7. The method recited in claim 6, wherein requesting the update to synchronize the application data associated with the registered application further comprises:
requesting the update to synchronize the application data associated with the registered application over an out-of-band D2D connection with a next update device selected from the D2D device list if the response timer expires before the update device responds to the update request;
restarting the response timer upon requesting the update to synchronize the application data from the next update device; and
synchronizing the application data using updated data received from the update device over the D2D connection while the update timer has not expired if the next update device responds to the update request before the restarted response timer expires.

8. The method recited in claim 6, further comprising:
synchronizing the application data associated with the registered application from a network server upon the update timer expiring.

9. The method recited in claim 1, further comprising:
restricting the D2D based application data synchronization service to applications that have registered for the D2D based application data synchronization service.

10. The method recited in claim 1, further comprising:
broadcasting the local unique expression associated with the registered application;
receiving, from a second device among the one or more peer devices, a request to update the application data associated with the registered application over a second D2D connection, wherein the last update time in the local unique expression is more recent than the last update time in the external unique expression received from the second device; and
transmitting updated data associated with the application to the second device over the second D2D connection.

11. A wireless device, comprising:
a transmitter configured to broadcast a local unique expression that includes a name, one or more user credentials, and a last update time associated with an application registered for a device-to-device (D2D) based application data synchronization service;
a receiver configured to receive one or more external unique expressions from one or more peer wireless devices in proximity to the wireless device; and
one or more processors configured to:
detect that the one or more external unique expressions match the name and the one or more user credentials associated with the registered application;
identify, among the one or more peer wireless devices, an update device associated with an external unique expression that includes a last update time more recent than the last update time associated with the local unique expression; and
request an update to synchronize the application data associated with the registered application from the update device over an out-of-band D2D connection.

12. The wireless device recited in claim 11, wherein the one or more processors are further configured to:
start one or more timers upon requesting the update to synchronize the application data over the D2D connection; and
synchronize the application data using updated data received from the update device over the D2D connection while the one or more timers have not expired.

13. The wireless device recited in claim 12, wherein the one or more processors are further configured to synchronize the application data associated with the registered application from a network server in response to the one or more timers expiring.

14. The wireless device recited in claim 11, wherein the one or more processors are further configured to:
maintain a D2D device list at the first device, wherein the D2D device list comprises one or more potential update devices from which an external unique expression matching the name and the one or more user credentials associated with the registered application was received;
add the update device to the D2D device list maintained at the first device;
select the update device from the D2D device list;
start a response timer and an update timer upon requesting the update to synchronize the application data from the update device; and
synchronize the application data using updated data received from the update device over the D2D connection while the update timer has not expired if the update device responds to the update request before the response timer expires.

15. The wireless device recited in claim 14, wherein the one or more processors are further configured to:
request the update to synchronize the application data associated with the registered application over an out-of-band D2D connection with a next update device selected from the D2D device list in response to the response timer expiring before the update device responds to the update request;
restart the response timer upon requesting the update to synchronize the application data from the next update device; and
synchronize the application data using updated data received from the update device over the D2D connection while the update timer has not expired if the next update device responds to the update request before the restarted response timer expires.

16. The wireless device recited in claim 14, wherein the one or more processors are further configured to synchronize the application data associated with the registered application from a network server upon the update timer expiring.

17. The wireless device recited in claim 11, wherein the one or more processors are further configured to restrict the D2D based application data synchronization service to applications that have registered for the D2D based application data synchronization service.

18. The wireless device recited in claim 11, wherein:
the receiver is further configured to receive, from a second device among the one or more peer wireless devices, a request to update the application data associated with the registered application over a second D2D connection, wherein the last update time in the local unique expression is more recent than the last update time in the external unique expression received from the second device; and the transmitter is further configured to transmit updated data associated with the application to the second device over the second D2D connection.

19. An apparatus, comprising:

means for generating a local unique expression that includes a name, one or more user credentials, and a last update time associated with an application registered for a device-to-device (D2D) based application data synchronization service;

means for detecting one or more external unique expressions that are received from one or more peer devices in proximity to the apparatus and match the name and the one or more user credentials associated with the registered application;

means for identifying, among the one or more peer devices, an update device associated with an external unique expression that includes a last update time more recent than the last update time associated with the local unique expression; and means for requesting an update to synchronize the application data associated with the registered application from the update device over an out-of-band D2D connection.

20. The apparatus recited in claim 19, further comprising:

means for starting one or more timers upon requesting the update to synchronize the application data over the D2D connection; and means for synchronizing the application data using updated data received from the update device over the D2D connection while the one or more timers have not expired.

21. The apparatus recited in claim 20, further comprising:

means for synchronizing the application data associated with the registered application from a network server in response to the one or more timers expiring.

22. The apparatus recited in claim 19, further comprising:

means for maintaining a D2D device list that comprises one or more potential update devices from which an external unique expression matching the name and the one or more user credentials associated with the registered application was received;

means for adding the update device to the D2D device list;

means for selecting the update device from the D2D device list;

means for starting a response timer and an update timer upon requesting the update to synchronize the application data from the update device; and means for synchronizing the application data using updated data received from the update device over the D2D connection while the update timer has not expired if the update device responds to the update request before the response timer expires.

23. The apparatus recited in claim 22, further comprising:

means for requesting the update to synchronize the application data associated with the registered application over an out-of-band D2D connection with a next update device selected from the D2D device list in response to the response timer expiring before the update device responds to the update request;

means for restarting the response timer upon requesting the update to synchronize the application data from the next update device; and means for synchronizing the application data using updated data received from the update device over the D2D connection while the update timer has not expired if the next update device responds to the update request before the restarted response timer expires.

24. The apparatus recited in claim 22, further comprising:

means for synchronizing the application data associated with the registered application from a network server upon the update timer expiring.

25. The apparatus recited in claim 19, further comprising:

means for restricting the D2D based application data synchronization service to applications that have registered for the D2D based application data synchronization service.

26. The apparatus recited in claim 19, further comprising:

means for broadcasting the local unique expression associated with the registered application;

means for receiving, from a second device among the one or more peer devices, a request to update the application data associated with the registered application over a second D2D connection, wherein the last update time in the local unique expression is more recent than the last update time in the external unique expression received from the second device; and means for transmitting updated data associated with the application to the second device over the second D2D connection.

27. A computer-readable storage non-transitory medium having computer-executable instructions recorded thereon, wherein the computer-executable instructions, when executed on a wireless device, cause the wireless device to:

generate a local unique expression that includes a name, one or more user credentials, and a last update time associated with an application registered for a device-to-device (D2D) based application data synchronization service;

detect one or more external unique expressions that are received from one or more peer devices in proximity to the wireless device and match the name and the one or more user credentials associated with the registered application;

identify, among the one or more peer devices, an update device associated with an external unique expression that includes a last update time more recent than the last update time associated with the local unique expression; and request an update to synchronize the application data associated with the registered application from the update device over an out-of-band D2D connection.

28. The computer-readable storage non-transitory medium recited in claim 27, wherein the computer-executable instructions, when executed on the wireless device, further cause the wireless device to:

start one or more timers upon requesting the update to synchronize the application data over the D2D connection; and synchronize the application data using updated data received from the update device over the D2D connection while the one or more timers have not expired.

29. The computer-readable storage non-transitory medium recited in claim 28, wherein the computer-executable instructions, when executed on the wireless device, further cause the wireless device to synchronize the application data associated with the registered application from a network server in response to the one or more timers expiring.

30. The computer-readable storage non-transitory medium recited in claim 27, wherein the computer-executable instructions further cause the wireless device to:

broadcast the local unique expression associated with the registered application;
receive, from a second device among the one or more peer devices, a request to update the application data associated with the registered application over a second D2D connection, wherein the last update time in the local unique expression is more recent than the last update time in the external unique expression received from the second device; and
transmit updated data associated with the application to the second device over the second D2D connection.

\* \* \* \* \*